United States Patent
Watanabe et al.

[11] Patent Number: 5,753,165
[45] Date of Patent: May 19, 1998

[54] PROCESS FOR PRODUCING A HARD ROLL

[75] Inventors: Atsuo Watanabe, Hirakata; Kenjiro Nakayama, Yawata; Shunsuke Kato, Hirakata, all of Japan

[73] Assignee: Yamauchi Corporation, Hirakata, Japan

[21] Appl. No.: 501,025

[22] PCT Filed: Dec. 20, 1994

[86] PCT No.: PCT/JP94/02143

§ 371 Date: Aug. 11, 1995

§ 102(e) Date: Aug. 11, 1995

[87] PCT Pub. No.: WO95/17298

PCT Pub. Date: Jun. 29, 1995

[30] Foreign Application Priority Data

Dec. 21, 1993 [JP] Japan .................. 5-321522

[51] Int. Cl.⁶ .................. B29C 39/10; B29C 39/38; B29C 39/40; B21C 13/00
[52] U.S. Cl. .................. 264/138; 264/161; 264/327; 264/257; 264/258; 264/275; 264/277; 264/263; 492/50; 492/56; 29/895.24; 29/895.212; 29/895.3; 29/895.32
[58] Field of Search ................ 264/138, 161, 264/327, 257, 258, 277, 275, 263, 102, 122; 29/895.211, 895.212, 895.3, 895.32

[56] References Cited

U.S. PATENT DOCUMENTS

| | | | |
|---|---|---|---|
| 871,554 | 11/1907 | Ayisworth | 264/102 |
| 2,505,807 | 5/1950 | Stott | 264/327 |
| 2,518,504 | 8/1950 | Stott | 264/327 |
| 2,719,330 | 10/1955 | Stott | 264/327 |
| 2,808,623 | 10/1957 | Foster | 264/327 |
| 3,049,762 | 8/1962 | Jackson | 264/327 |
| 3,555,140 | 1/1971 | Argereu | 264/263 |
| 4,892,696 | 1/1990 | Murakami et al. | 264/219 |
| 5,089,201 | 2/1992 | Takahashi | 264/161 |
| 5,091,027 | 2/1992 | Watanabe | 264/257 |
| 5,656,176 | 8/1997 | Scott | 264/122 |

FOREIGN PATENT DOCUMENTS

| | | |
|---|---|---|
| 1-163017 | 6/1989 | Japan . |
| 3-331 | 1/1991 | Japan . |
| 3-1128 | 3/1991 | Japan . |
| 5-280531 | 10/1993 | Japan . |

*Primary Examiner*—Jan H. Silbaugh
*Assistant Examiner*—Robin S. Gray
*Attorney, Agent, or Firm*—Armstrong, Westerman, Hattori, McLeland & Naughton

[57] ABSTRACT

A process for producing a hard roll for use as an elastic roll for making paper calendering by casting a liquid thermosetting resin material into a space between a metal roll core and an outer mold, and thereafter heating the resin material from outside to cure a major portion of the material and to form an outer layer resin intermediate body, while cooling the resin material from the roll core side to leave a viscount liquid resin material layer inside the intermediate body. The intermediate body is subsequently cooled from outside the outer mold to contract the body, allowing an excess of the liquid material to be forced out upwardly with the contraction of the body. The material is thereafter heated from the roll core side to cure the remaining viscous liquid resin material. The hard roll can be produced without cracking due to the reaction contraction and thermal shrinkage of the thermosetting resin. The roll is usable without cracking in its surface hardness despite the influence of heat. The process is reduced in the number of steps and improved in production efficiency to ensure a low production cost.

12 Claims, 15 Drawing Sheets

PROCESS FOR PRODUCING A HARD ROLL

TECHNICAL FIELD

The present invention relates to a process for producing hard rolls for use in papermaking, fibers and various other industries, and more particularly to a process for producing hard rolls for use as elastic rolls including papermaking calender rolls, papermaking press rolls (inclusive of rolls substituted for papermaking stone rolls and rolls substituted for papermaking rubber rolls), fiber calender rolls, calender rolls for magnetic recording materials, etc.

BACKGROUND ART

For example, for calendering, paper, fibers, magnetic recording materials or like thin material is usually passed between a mirror-surfaced metal roll and an elastic roll opposed thereto at a predetermined temperature and high nip pressure and is made smooth and glossy over the surface by the application of pressure.

Already known as such a calender roll is a hard roll having a lower winding layer provided around a metal roll core by winding a fiber material impregnated with epoxy resin around the core outer periphery, and a covering layer of epoxy resin formed directly around the lower winding layer by cast molding (see, for example, Examined Japanese Patent Publication SHO 61-15807).

However, epoxy resin or like thermosetting resin generally undergoes marked reaction contraction and thermal shrinkage when curing, so that the following problem is encountered. The covering layer is likely to crack in its surface owing to the shrinkage during production. This phenomenon appears markedly in hard rolls having a large diameter and a large length, with the result that great difficulties are experienced in producing such hard rolls.

Accordingly, we previously proposed a process free of the foregoing problem for producing hard rolls (see Examined Japanese Patent Publication HEI 3-47359). The proposed process comprises forming a metal roll core having a fiber-reinforced lower winding layer, forming an outer layer hollow cylinder of predetermined size independently of the roll core by casting a thermosetting resin material into a specified mold and curing the material, then fitting the outer layer hollow cylinder around the metal roll core having the fiber-reinforced lower winding layer, casting an adhesive of low viscosity into an annular clearance formed between the cylinder and the winding layer and curing the adhesive to bond the cylinder to the winding layer with the adhesive.

The roll produced by the proposed process of course had excellent surface smoothness, high surface hardness and high heat resistance. Especially no crack developed in the surface of the outer layer cylinder of thermosetting synthetic resin during production or use. Moreover, the roll retained surface hardness which remained almost unchanged even when subjected to heat during use, had compression strength sufficient to withstand the high nip pressure to be applied by a metal roll and was satisfactorily usable at all times with high durability.

However, with the proposed process for producing hard rolls, the outer layer hollow cylinder having a predetermined size and cured was prepared independently of the metal roll core and thereafter bonded to the lower winding layer with an adhesive of low viscosity cast into the annular clearance between the cylinder and the layer, so that the process had the problem of including many steps and being low in production efficiency and therefore relatively high in production cost.

An object of the present invention, which has been accomplished in view of the above problems, is to provide a process for producing a hard roll free of cracking due to the reaction contraction and thermal shrinkage of thermosetting resin, the roll being usable without cracking in its surface and having high durability to remain almost unchanged in its surface hardness despite the influence of heat during use, the process being reduced in the number of steps and improved in production efficiency to consequently ensure a very low production cost.

DISCLOSURE OF THE INVENTION

The present invention provides a process for producing a hard roll which is characterized in that the process comprises a first step of disposing an outer layer forming outer mold around a metal roll core provided in an upright position at a predetermined distance from the core to form between the roll core and the outer mold a resin material casting space having a closed lower end and an open upper end and casting a liquid thermosetting resin material into the space, a second step of heating the thermosetting resin material from outside the outer mold to cure a major portion of the material and form an outer layer resin intermediate body while cooling the material from the roll core side to hold a portion of the material in a viscous liquid state on the surface of the roll core and leave a viscous liquid resin material layer inside the outer layer resin intermediate body, a third step of subsequently cooling the outer layer resin intermediate body from outside the outer mold to contract the intermediate body chiefly by thermal shrinkage of the intermediate body and allowing an excess of the material of the viscous liquid resin material layer inside the intermediate body to be forced out beyond the upper end of the intermediate body with the contraction of the intermediate body while heating the viscous liquid resin material layer from the roll core side to cure the remaining viscous liquid resin material and form a cured thermosetting resin outer layer joined to the outer periphery of the roll core, and a fourth step of cutting at least an upper end portion of the thermosetting resin outer layer to form an outer layer end face approximately perpendicular to the roll core.

In order to inhibit the curing reaction of the liquid thermosetting resin material cast into the space, it is desired to cast the liquid resin material into the space in the first step while cooling the material from the roll core side and to continue the core-side cooling of the first step in the second step to thereby hold the resin material viscous and liquid on the surface of the roll core and leave the viscous liquid resin material layer.

A fiber-reinforced lower winding layer may be provided around the outer periphery of the metal roll core.

Two different means are available for use in the second step and the third step for cooling or heating the thermosetting resin material cast into the space between the roll core and the outer mold, from the roll core side.

As one of these means, the metal roll core is hollow and has a cooling or heating fluid passage in its interior, and upper and lower end shaft portions which are respectively formed with a fluid outlet and a fluid inlet in communication with the fluid passage in the interior. In this case, a cooling fluid is passed through the fluid passage inside the roll core in the second step to cool the liquid thermosetting resin material from the roll core side, and a heating fluid is passed through the fluid passage in the third step to heat the viscous liquid resin material layer from the roll core side and cure the remaining viscous liquid resin material.

As the other means, a helical cooling-heating pipe is wound around the outer periphery of the metal roll core for passing a cooling or heating fluid therethrough. In this case, the cooling fluid is passed through the helical pipe in the second step to cool the liquid thermosetting resin material from the roll core side, and the heating fluid is passed through the helical pipe in the third step to heat the viscous liquid resin material layer from the roll core side and cure the remaining viscous liquid resin material.

In the case where the helical pipe is used, the third step of forming the thermosetting resin outer layer is followed by the fourth step in which outer layer end faces approximately perpendicular to the roll core need to be formed by cutting the thermosetting resin outer layer at its upper and lower end portions and removing upper and lower end portions of the helical pipe. When the helical pipe is used, the metal roll core may be hollow or solid.

The helical cooling-heating pipe to be used is a metal pipe, resin pipe, rubber pipe or the like which has a small diameter.

The helical cooling-heating pipe is attached to the metal roll core by forming a helical pipe fitting groove in the outer peripheral surface of the metal roll core and helically winding the pipe around the core as fitted in the groove, or alternatively by forming a fiber-reinforced lower winding layer around the outer periphery of the metal roll core, forming a helical pipe fitting groove in the outer peripheral surface of the winding layer and winding the pipe around the layer helically as fitted in the groove.

When a metal pipe or the like which itself has a relatively high strength is used as the helical cooling-heating pipe, formation of the thermosetting resin outer layer around the roll core having the helical pipe is followed by the next step of forming outer layer end faces substantially perpendicular to the roll core by cutting the upper and lower end portions of the resin outer layer and removing the upper and lower end portions of the pipe, with the interior of the pipe left as it is. However, in the case where a metal pipe, resin pipe, rubber pipe or the like which has a relatively low strength is used as the helical cooling-heating pipe, formation of the thermosetting resin outer layer around the roll core having the helical pipe must be followed by casting of liquid thermosetting resin material into the helical pipe and curing of the resin material to form a filling layer in the interior of the helical pipe.

With the process of the invention described, the liquid thermosetting resin material can be cast into the space only to the level of the upper end of the roll core in the first step, so that the upper end face of the thermosetting resin outer layer becomes positioned below the upper end face of the roll core owing to shrinkage on curing.

As one mode of practicing the present invention, therefore, the first step comprises disposing an outer layer forming inner mold on the upper end of the metal roll core like an extension of the roll core in addition to the outer layer forming outer mold disposed around the upright roll core to form a resin material casting space defined by the roll core, the inner mold and the outer mold and having a closed lower end and an open upper end. The liquid thermosetting resin material is cast into this space to a level above the upper end of the roll core.

The second and third steps are thereafter practiced in the same manner as described above, followed by the fourth step, in which at least the upper end portion of the thermosetting resin outer layer is cut to form an outer layer end face flush with the upper end face of the roll core.

In this mode of practicing the present invention, the metal roll core may have a fiber-reinforced lower winding layer on its outer periphery.

The process of the present invention produces rolls having excellent surface smoothness, high surface hardness and outstanding heat resistance. Especially in the second step, the liquid thermosetting resin material is heated from outside the outer mold to cure a major portion of the material and form an outer layer resin intermediate body while the material is cooled from the roll core side to hold a portion of the material in a viscous liquid state on the surface of the roll core and leave a viscous liquid resin material layer inside the outer layer resin intermediate body, and in the next third step, the outer resin intermediate body is cooled from outside the outer mold to contract the intermediate body chiefly by thermal shrinkage of the body and an excess of the material of the viscous liquid resin material layer inside the intermediate body is allowed to be forced out beyond the upper end of the body with the contraction of the body while the viscous liquid resin material layer is heated from the roll core side and cured to form a cured thermosetting resin outer layer as joined to the outer periphery of the roll core. Consequently, the outer layer of the hard roll has no residual stress, and no cracking occurs in the surface of the thermosetting resin outer layer during the production of the roll.

The hard roll produced by the process of the invention remains free of cracking in its surface and resistant to breakage at its outer layer even if subjected to a high pressure during use. Furthermore, the roll remains almost unchanged in its surface hardness when subjected to heat during use, has compressive strength to withstand a high nip pressure to be applied by a metal roll and is always satisfactorily usable with high durability.

Additionally, the process of the invention is greatly reduced in the number of steps and improved in production efficiency to produce hard rolls at a very low cost.

Especially in the case where a helical cooling-heating pipe is wound around the outer periphery of the metal roll core, the pipe ensures smooth conduction of heat for cooling and heating. This results in the following advantage. A cooling fluid is passed through the helical pipe in the second step, whereby the liquid thermosetting resin material is uniformly cooled from the roll core side, and a heating fluid is passed through the helical pipe in the third step to heat the viscous liquid resin material layer from the roll core side, thereby uniformly curing the remaining viscous liquid resin material.

The process of the invention is useful of course for producing rolls of small size and those of medium size but also for producing large rolls, such as papermaking calender rolls, which were conventionally difficult to make, and has the advantage of producing large rolls having an exceedingly high compressive strength.

In the case where a hard roll having an outer layer end face which is flush with the end face of the roll core is to be produced by the process of the invention, an outer layer forming inner mold is disposed in the first step on the upper end of the metal roll core as if extending therefrom in addition to the outer layer forming outer mold disposed around the upright roll core and spaced therefrom by a predetermined distance to form a resin material casting space defined by the roll core, the inner mold and the outer mold and having a closed lower end and an open upper end. The liquid thermosetting resin material is cast into this space to a level above the upper end of the roll core.

The second and third steps are then practiced in the same manner as previously described. Finally in the fourth step, at least an upper end portion of the thermosetting resin outer layer is cut to form an outer layer end face which is flush with the upper end face of the roll core.

The process of the invention to be practiced in this mode also nullifies the residual stress in the outer layer of the hard roll, totally eliminating the likelihood of cracks developing in the surface of the thermosetting resin outer layer during production and providing a roll which has excellent surface smoothness, high surface hardness and outstanding heat resistance. Moreover, the process is greatly reduced in the number of steps and improved in production efficiency, making it possible to produce hard rolls with the outstanding properties described at a very low cost.

BRIEF DESCRIPTION OF THE DRAWINGS

FIG. 1 is a view in vertical section showing a resin material cast into an outer mold in a first step while the resin material is being heated from outside the outer mold and cooled from inside a roll core in a second step;

FIG. 2 is a view in vertical section showing an excess of the material of a viscous liquid resin material layer as forced out beyond the upper end portion of an outer layer resin intermediate body by the thermal shrinkage of the body when the intermediate body is cooled from outside the outer mold in the first half of a third step;

FIG. 3 is a view in vertical section showing the viscous liquid resin material layer while the layer is being heated from inside the roll core for curing in the second half of the third step;

FIG. 4 is a view in vertical section showing a hard roll resulting from a fourth step;

FIG. 5 is a view in vertical section showing a resin material cast into an outer mold in a first step while the resin material is being heated from outside the outer mold and cooled from inside a roll core in a second step;

FIG. 6 is a view in vertical section showing an excess of the material of a viscous liquid resin material layer as forced out beyond the upper end portion of an outer layer resin intermediate body by the thermal shrinkage of the body when the intermediate body is cooled from outside the outer mold in the first half of a third step;

FIG. 7 is a view in vertical section showing the viscous liquid resin material layer while the layer is being heated from inside the roll core for curing in the second half of the third step;

FIG. 8 is a view in vertical section showing a hard roll resulting from a fourth step;

FIG. 9 is a view in vertical section showing a resin material cast into an outer mold in a first step while the resin material is being heated from outside the outer mold and cooled by a helical pipe around the outer periphery of a roll core in a second step;

FIG. 10 is an enlarged fragmentary view in vertical section of FIG. 9;

FIG. 11 is a view in vertical section showing an excess of the material of a viscous liquid resin material layer as forced out beyond the upper end portion of an outer layer resin intermediate body by the thermal shrinkage of the body when the intermediate body is cooled from outside the outer mold in the first half of a third step;

FIG. 12 is a view in vertical section showing the viscous liquid resin material layer while the layer is being heated for curing by the helical pipe around the roll core in the second half of the third step;

FIG. 13 is a view in vertical section showing a hard roll resulting from a fourth step;

FIG. 14 is an enlarged fragmentary view in vertical section corresponding to FIG. 10 and showing a filling layer formed in the interior of the helical pipe after a thermosetting resin outer layer has been formed;

FIG. 15 is a view in vertical section showing a resin material cast into an outer mold in a first step while the resin material is being heated from outside the outer mold and cooled by a helical pipe around a fiber-reinforced lower winding layer on a roll core in a second step;

FIG. 16 is a view in vertical section showing an excess of the material of a viscous liquid resin material layer as forced out beyond the upper end portion of an outer layer resin intermediate body by the thermal shrinkage of the body when the intermediate body is cooled from outside the outer mold in the first half of a third step;

FIG. 17 is a view in vertical section showing the viscous liquid resin material layer while the layer is being heated for curing by the helical pipe around the lower winding layer on the roll core in the second half of the third step; and FIG. 18 is a view in vertical section showing a hard roll resulting from a fourth step.

BEST MODES OF CARRYING OUT THE INVENTION

Figure 1:
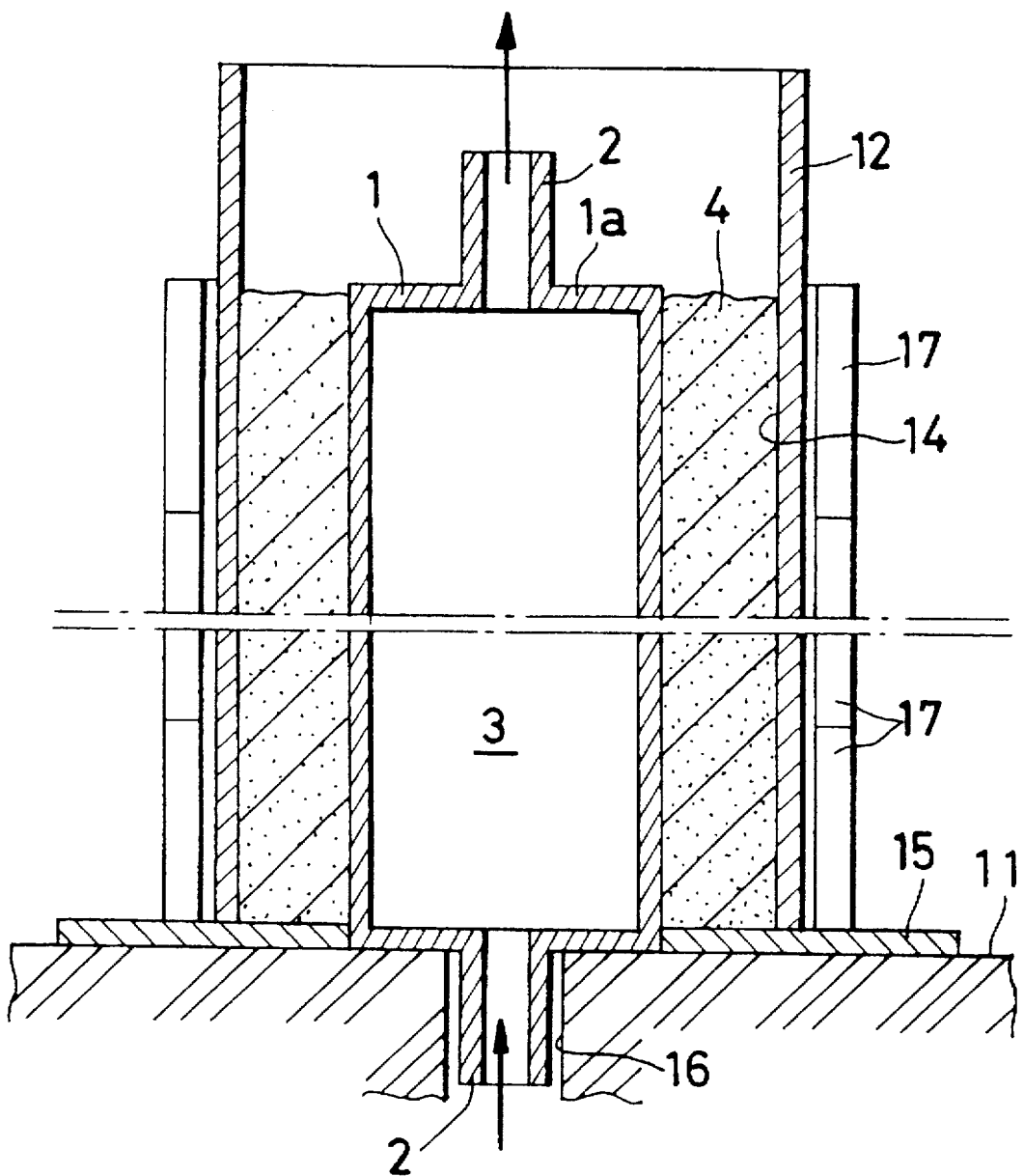
FIGS. 1 to 4 show a first mode of practicing the process of the invention stepwise.

Next, the process of the present invention will be described in detail with reference to the drawings.

Throughout the drawings, like parts are designated by like reference numerals.

FIGS. 1 to 4 show a first mode of practicing the process of the invention stepwise.

First Step

As shown in FIG. 1, a hollow metal roll core 1 having a heating or cooling fluid passage 3 in its interior is disposed upright on a base 11. The roll core 1 is provided at its respective opposite ends with shaft portions 2, 2 respectively having a fluid outlet and a fluid inlet in communication with the fluid passage 3 inside the roll core 1.

The roll core 1 has its lower shaft portion 2 inserted in a shaft bore 16 of the base 11. Disposed outside the roll core 1 is a support plate 15 of required height for adjusting the length of the surface of the roll to be formed. An outer layer forming outer mold 12 is provided on the support plate 15 around the roll core 1 at a predetermined distance from the core to form between the roll core 1 and the outer mold 12 a resin material casting space 14 having a lower end closed with the support plate 15 and an open upper end.

Although the outer mold 12 is made of a material which is not limited specifically, usually useful as the mold is a hollow cylinder of synthetic resin, such as polycarbonate resin, metal hollow cylinder or the like which has a specified diameter. The metal roll core 1 is made of a metal such as iron, copper, stainless steel or aluminum and preferably has its outer periphery rough-surfaced as by sandblasting or spirally forming a multiplicity of grooves.

Next, a liquid thermosetting resin material 4 is cast into the space 14.

Examples of useful thermosetting resins are epoxy resin, unsaturated polyester resin, diallyl phthalate resin, polyurethane resin, etc. Usually used is such a resin of the type curable by heating.

Preferably, the thermosetting resin is in the form of a liquid (including a highly consistent one) at room temperature so that the shrinkage thereof due to curing can be controlled by heating from outside the outer mold and by cooling or heating from inside the roll core.

A filler in the form of a finely divided inorganic material, such as quartz, glass beads, hydrated alumina, clay powder, silica powder or calcium carbonate, may be admixed with the thermosetting resin. The finely divided inorganic material is 0.1 to 200 µm, preferably 5 to 100 µm, in mean particle size. If larger than 200 µm in mean particle size, the finely divided inorganic material is difficult to disperse in the resin uniformly, while such materials less than 0.1 µm in size are not readily available.

Second Step

With reference to FIG. 1, the thermosetting resin material 4 is then heated by a heater 17 from outside the outer mold 12 to cure a major portion of the material 4 and form an outer layer resin intermediate body 5, while water or like cooling fluid is admitted to the fluid inlet of lower shaft portion 2 of the roll core 1 inserted in the shaft bore 16 in the base 11, passed through the fluid passage 3 of the roll core 1 and discharged from the fluid outlet of upper shaft portion 2 of the core 1, whereby the liquid resin material 4 is cooled, for example, to −30 to 50° C., preferably 5° to 30° C., from inside the roll core 1 to hold a portion of the resin material 4 on the surface of the core 1 viscous and liquid and to leave a viscous liquid resin material layer 4a inside the outer resin intermediate body 5.

In order to inhibit the curing reaction of the liquid thermosetting resin material 4 cast into the space 14, it is desired to cast the liquid resin material 4 into the space 14 in the first step while cooling the material from inside the roll core 1 and to continue the core-side cooling of the first step in the second step to thereby hold the portion of resin material 4 on the surface of the roll core 1 viscous and liquid and leave the viscous liquid resin material layer 4a. This results in the advantage of preventing the autogenous exothermic reaction of the resin material 4.

The curing temperature of the thermosetting resin is usually 100° to 300° C. although dependent on the type of resin used. Preferably, the heating of the material from outside the outer mold 12 by the heater 17 is done stepwise. For example, it is desired to divide heating portion of the heater 17 outside the mold 12 into several blocks and to operate the heater 17 from block to block upward to cure the resin, or to raise the heating temperature stepwise, for example, to 100° C., 150° C. and 200° C. Preferably, the thickness of the viscous liquid resin material layer 4a inside the intermediate body 5 is controlled, for example, to about 1 to about 5 mm.

Third Step

Figure 2:
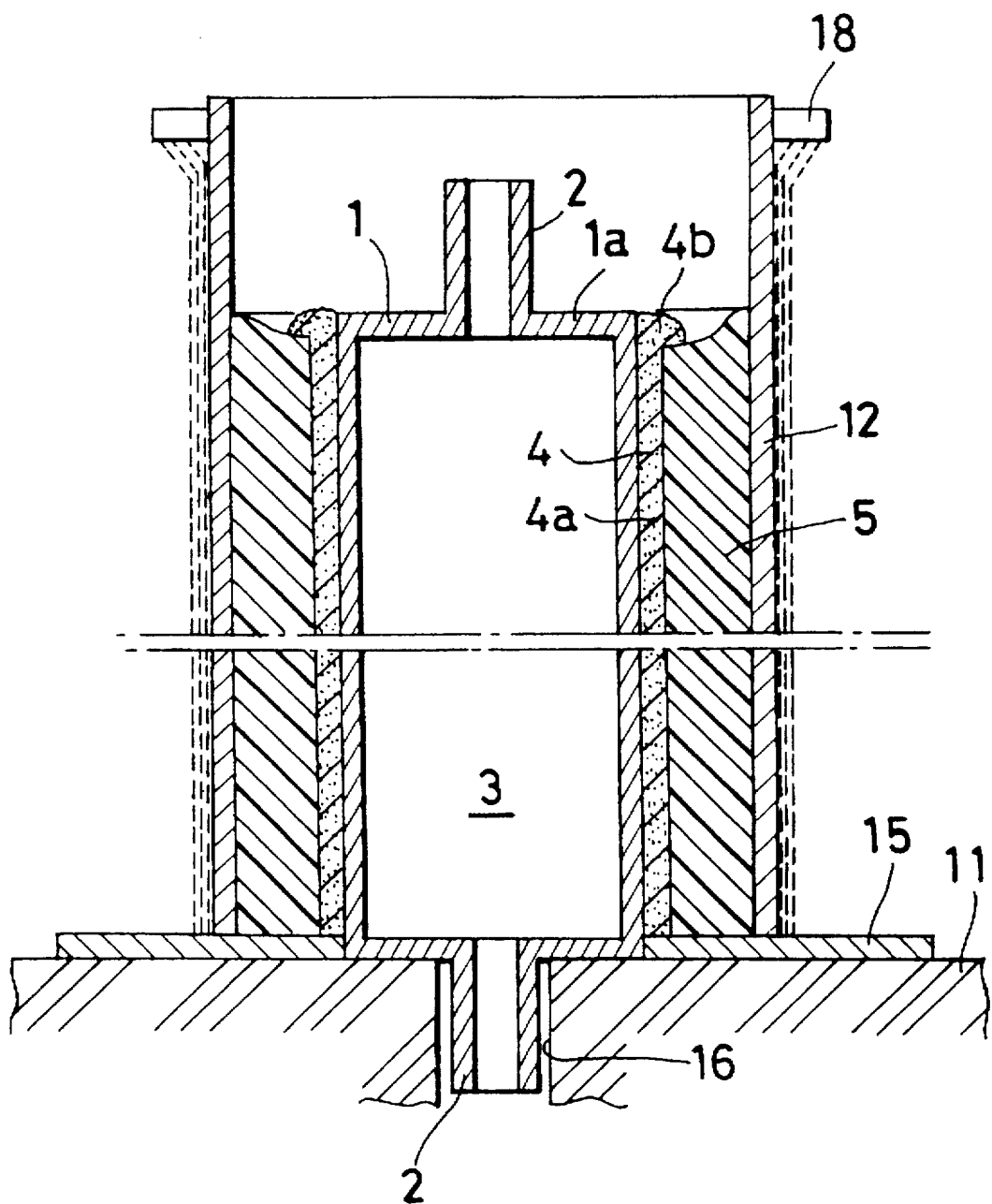

Next with reference to FIG. 2, the outer layer resin intermediate body 5 is cooled from outside the outer mold 12 and maintained at a low temperature of about 60° C. by causing water or like cooling fluid to flow down the mold 12 from a hose 18 provided around the upper end of outer periphery of the mold 12 and having a multiplicity of orifices, whereby the body 5 is contracted chiefly by the thermal shrinkage thereof, allowing an excess 4b of the material of the viscous liquid resin material layer 4a inside the intermediate body to be forced out beyond the upper end of the body 5 with the contraction of the body 5.

Figure 3:
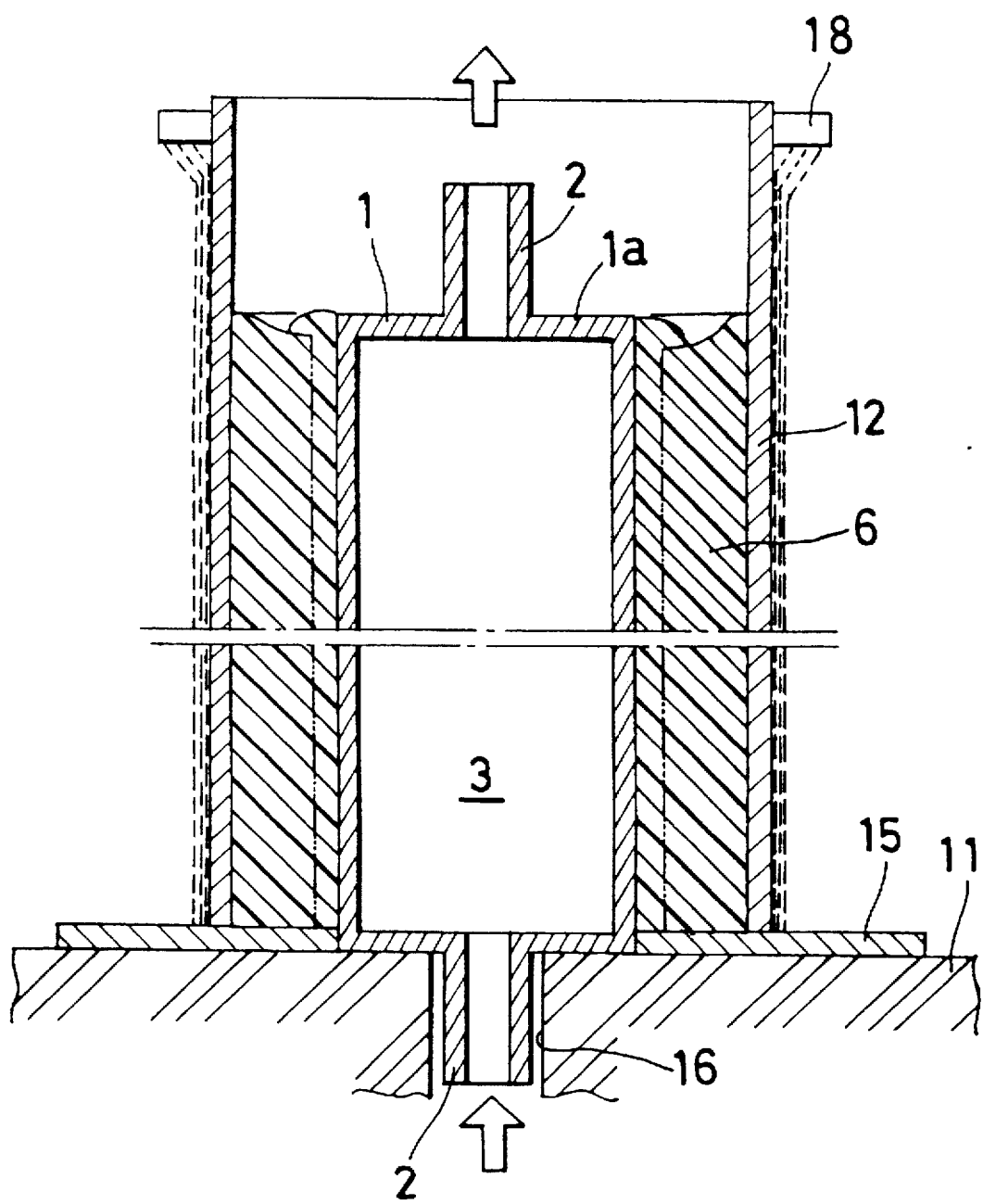
Figure 4:
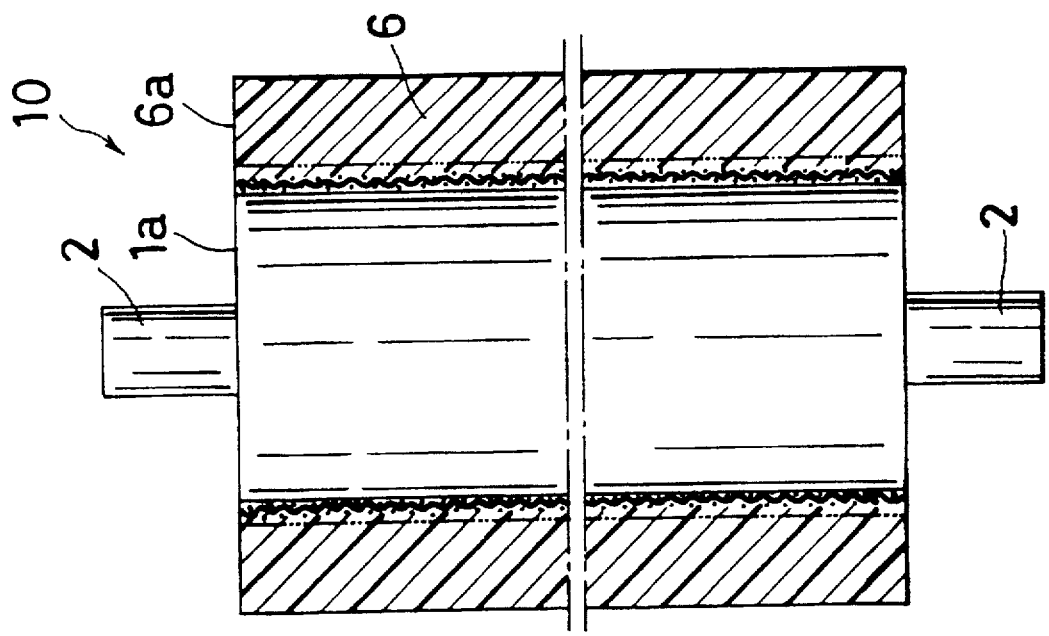
Figure 8:
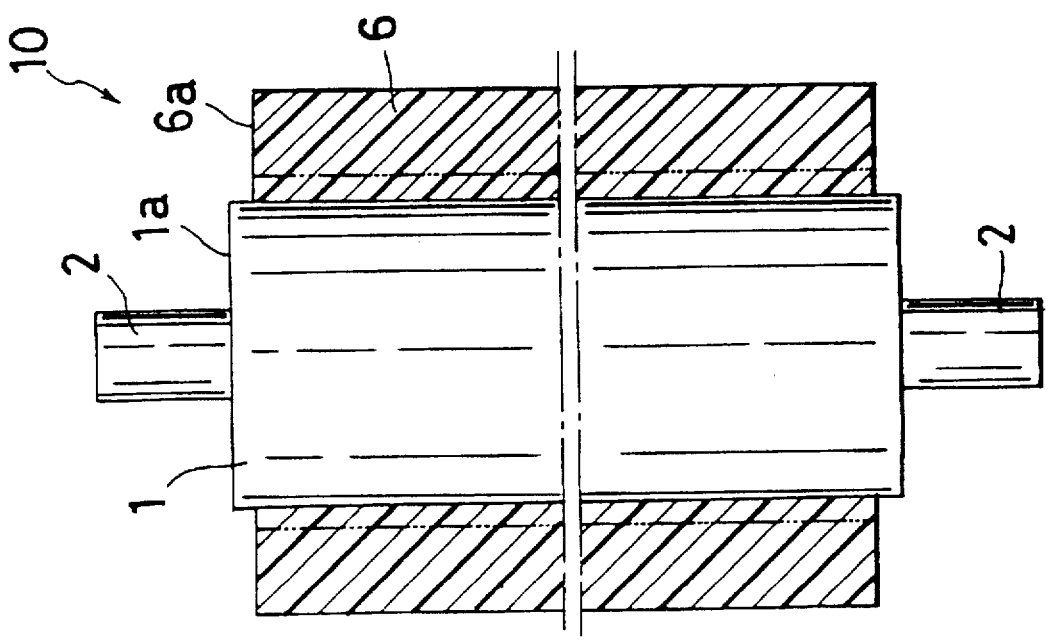
FIGS. 5 to 8 show a second mode of practicing the process of the invention stepwise.

As shown in FIG. 3, hot water or like heating fluid is subsequently admitted to the fluid inlet of the lower shaft portion 2 of the roll core 1 inserted in the shaft bore $^{16}$in the base 11, passed through the fluid passage 3 of the roll core 1 and discharged from the fluid outlet of the upper shaft portion 2 of the core 1, whereby the viscous liquid resin material layer 4a is heated from inside the roll core 1 to cure the remaining viscous liquid resin material 4a. The layer 4a is heated to about 60° C. from inside the core 1 by passing the hot water or like heating fluid through the passage 3 of the core 1 to cure the remaining viscous liquid resin material 4 and form a cured thermosetting resin outer layer 6 as joined to the outer periphery of the roll core 1.

When the inside temperature of the roll core 1 is further raised to 80° to 90° C. in the above step, promoted curing is effected, causing the layer 4a to be bonded to the core 1 with enhanced strength. If the temperature at which the intermediate body is cooled from outside the mold 12 is further lowered, the resin material layer 4a can be free of occurrence of thermal stress due to curing.

Although the resin undergoes thermal shrinkage and reaction contraction when cured as previously stated, the outer layer resin intermediate body 5 is allowed to contract owing to thermal shrinkage and reaction contraction, with the viscous liquid resin material layer 4a left inside the body 5, while permitting the excess 4b of the material of the layer 4a to be forced out beyond the upper end of the intermediate body 5, so that the thermosetting resin can be fully cured to form the outer layer 6 which has satisfactory surface smoothness, high surface hardness and excellent compressive strength and heat resistance.

It is desired that the curing temperature of the roll 10 be eventually nearly in match with the operating temperature of the hard roll 10 as produced because the residual stress of the thermosetting resin outer layer 6 then becomes nullified when the roll 10 is used, rendering the outer layer 6 resistant to breakage under a high pressure.

Eventually, the thickness of the outer layer 6 is 5 to 100 mm, preferably 15 to 30 mm. If the thickness of the layer 6 is less than 5 mm, an insufficient strength will result, leading to low durability. Thicknesses in excess of 100 mm fail to produce a correspondingly increased effect with respect to strength, entail an increased cost and therefore are not desirable.

Fourth Step

After the resin has been cured, the molding is removed from the outer mold 12 to obtain a hard roll 10. The upper end portion of the roll which has an irregular shape owing to the curing of the outer layer 6 is cut by a cutting tool (not shown) to remove an unnecessary portion of the resin. The surface of the outer layer 6 is ground by a grinder to give the hard roll 10 an outer layer end face 6a which is approximately perpendicular to the roll core 1 (see FIG. 4).

With the process of the invention, the liquid thermosetting resin material 4 can be cast into the space only to the level of the upper end of the roll core 1 in the first step, so that the upper end of the thermosetting resin outer layer 6 becomes positioned below the upper end face 1a of the roll core 1 owing to shrinkage on curing. However, the support plate 15 of required height for adjusting the length of the roll surface is disposed on the base 11 around the lower end of the core 1, such that the unnecessary resin portion can be cut off from the upper end portion of the resin outer layer 6 by the cutting tool to give the resin outer layer 6 an effective surface length which is shorter than the surface length of the roll core 1.

FIGS. 5 to 8 show a second mode of practicing the process of the invention.

First Step

In addition to an outer layer forming outer mold 12 provided on a base 11 around a metal roll core 1 at a predetermined distance from the core, an outer layer forming inner mold 13 is disposed on the upper end of the roll core 1 as if extending therefrom to form a resin material casting space 14 defined by the core 1, outer mold 12 and inner mold 13 and having a closed lower end and an open upper end. A liquid thermosetting resin material 4 is cast into this space 14 to a level above the upper end of the roll core 1.

The illustrated metal roll core 1 has a fiber-reinforced lower winding layer 7 made of a fiber material impregnated with a thermosetting resin and formed by winding the material around the outer peripheral surface of the core to a thickness, for example, of 1 to 50 mm, preferably 6 to 15 mm. The lower winding layer 7 can be bonded to the core 1 with an increased strength when the peripheral surface of the roll core 1 is roughed as by sandblasting before winding.

The fiber material for forming the lower winding layer 7 may be an inorganic fiber or organic fiber. It is desirable to use an inorganic fiber, such as glass fiber, carbon fiber or metal fiber, which is hard, has high ability to restore itself elastically, exhibits good adhesion to resins and exerts a high fastening force. Also usable is an organic fiber such as polyamide fiber, armoatic polyamide fiber, polyimide fiber, polyester fiber, phenolic fiber or acrylic fiber.

The fiber material is in the form of a yarn, roving, cloth, nonwoven fabric, so-called triaxial screen (netting of warps and wefts joined at their intersections with an adhesive) or the like. Preferably, the fiber material is used in the form of a tape when it is a cloth, nonwoven fabric or triaxial screen. In view of the strength of the roll 10 to be prepared, the cloth tape or the combination of roving and cloth tape is desirable.

The thermosetting resin to be applied to the fiber material by impregnation is, for example, epoxy resin, unsaturated polyester resin, dially phthlate resin, polyurethane resin or the like. A filler comprising the above-mentioned finely divided inorganic material, such as silica powder, may be admixed with the thermosetting resin.

The metal roll core 1 is not aways formed with the fiber-reinforced lower winding layer 7 on its outer peripheral surface.

Second Step

Figure 5:
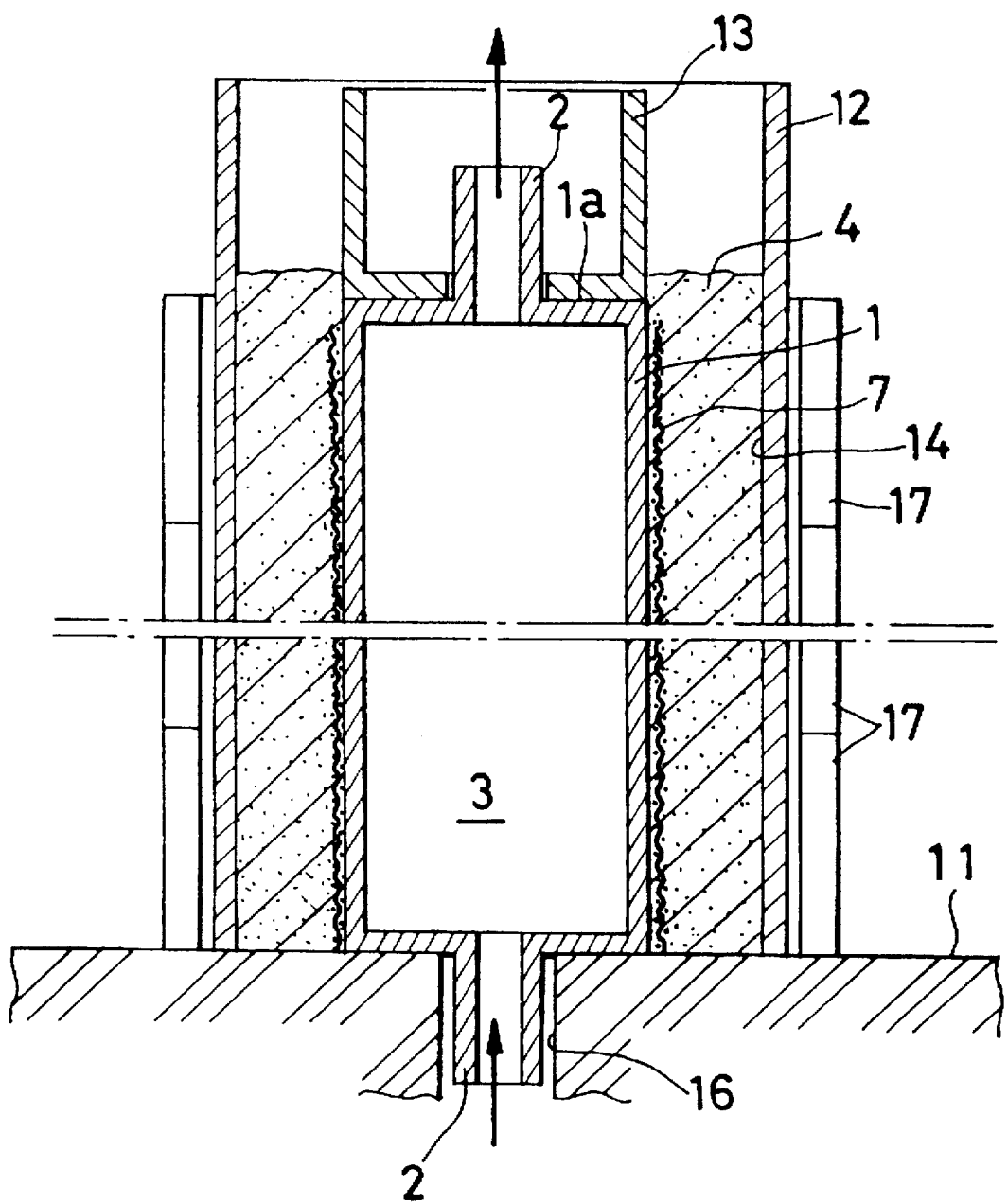

Next as seen in FIG. 5, the thermosetting resin material 4 is heated by a heater 17 from outside the outer mold 12 to cure a major portion of the resin material and form an outer layer resin intermediate body 5 as in the first mode, while the material 4 is cooled from inside the roll core 1, for example, to −30° to 50° C., preferably, to 5° to 30° C., to hold the portion of resin material 4 on the surface of the winding layer 7 and on the surface of the inner mold 13 viscous and liquid and leave a viscous liquid resin material layer 4a inside the intermediate body 5.

To inhibit the curing reaction of the liquid thermosetting resin material 4 cast into the space 14 as in the case of the first mode, the liquid resin material 4 may be cast into the space 14 in the first step while cooling the material from inside the roll core 1, and the core-side cooling of the first step continued in the second step to thereby hold the portion of resin material 4 on the surface of the roll core 1 viscous and liquid and leave the viscous liquid resin material layer 4a.

As is the case with the first mode, the material is heated by the heater 17 from outside the outer mold 12 preferably stepwise usually at 100° to 300° C.

Further as in the first mode, it is desirable to control the viscous liquid resin material layer 4a inside the intermediate body 5, for example, to a thickness of about 1 to about 5 mm.

Third Step

Figure 6:
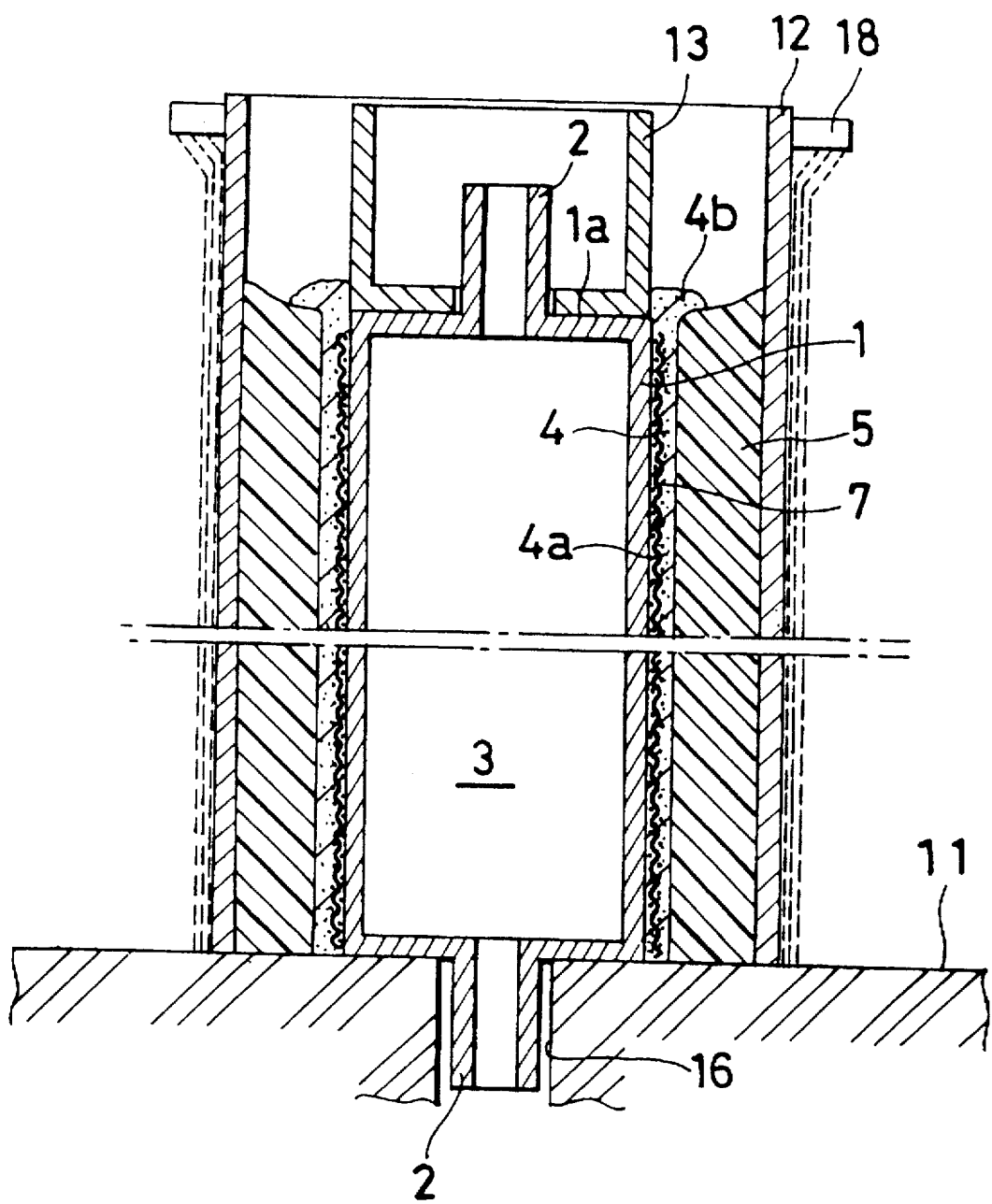

Next as shown in FIG. 6 and as in the case of the first mode, the outer layer resin intermediate body 5 is cooled from outside the outer mold 12 and maintained at a low temperature of about 60° C. by causing water or like cooling fluid to flow down the mold 12 from a hose 18 provided around the upper end of outer periphery of the mold 12 and having a multiplicity of orifices, whereby the body 5 is contracted chiefly by the thermal shrinkage thereof, allowing an excess 4b of the material of the viscous liquid resin material layer 4a inside the intermediate body to be forced out beyond the upper end of the body 5 with the contraction of the body 5.

Figure 7:
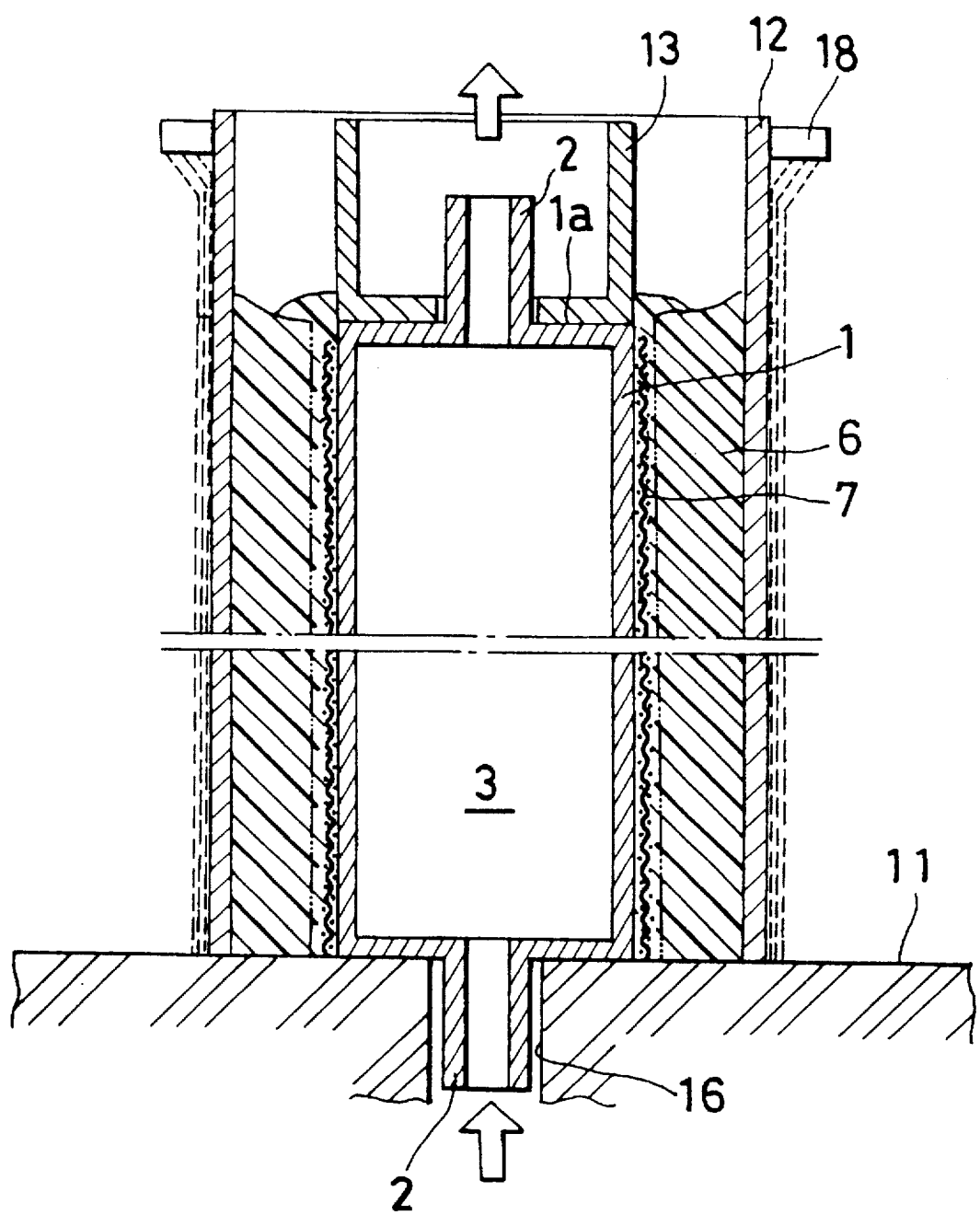

With reference to FIG. 7, hot water or like heating fluid is subsequently passed through the inside passage 3 of the roll core 1 via the lower shaft portion 2 of the core 1 inserted in a shaft bore 16 of the base 11 to heat the viscous liquid resin material layer 4a at about 60° C. from inside the roll core 1 and cure the remaining viscous liquid resin material 4, whereby a thermosetting resin outer layer 6 is formed as cured and joined to the outer periphery of the roll core 1.

When the inside temperature of the roll core 1 is further raised to 80° to 90° C. in the above step, promoted curing is effected, causing the layer 4a to be bonded to the core 1 with enhanced strength. If the temperature at which the intermediate body is cooled from outside the mold 12 is further lowered at the same time, the layer 4a can be free of occurrence of thermal stress due to curing.

Fourth Step

After the resin has been cured, the outer mold 12 and the inner mold 13 are removed to obtain a hard roll 10. The thermosetting resin material 4 is cast in the first step to a level above the upper end of the roll core 1, with the result that the thermosetting resin outer layer 6 is formed to a level above the upper end face 1a of the core 1. The upper end portion of the outer layer 6 which has an irregular shape owing to the curing thereof is cut by a cutting tool (not shown) to remove an unnecessary portion of the resin, and the surface of the outer layer 6 is ground by a grinder to form an outer layer end face 6a which is flush with the upper end face 1a of the roll core 1. The resin outer layer 6 of the hard roll 10 thus prepared has an effective surface length equal to the surface length of the roll core 1 (see FIG. 8).

FIGS. 9 to 14 show a third mode of practicing the process of the invention stepwise.

In this mode of practice, a helical cooling-heating pipe 21 for passing a cooling or heating fluid therethrough is provided around the outer periphery of a metal roll core 1 as means for cooling or heating the resin material from the roll core side.

First Step

Figure 9:
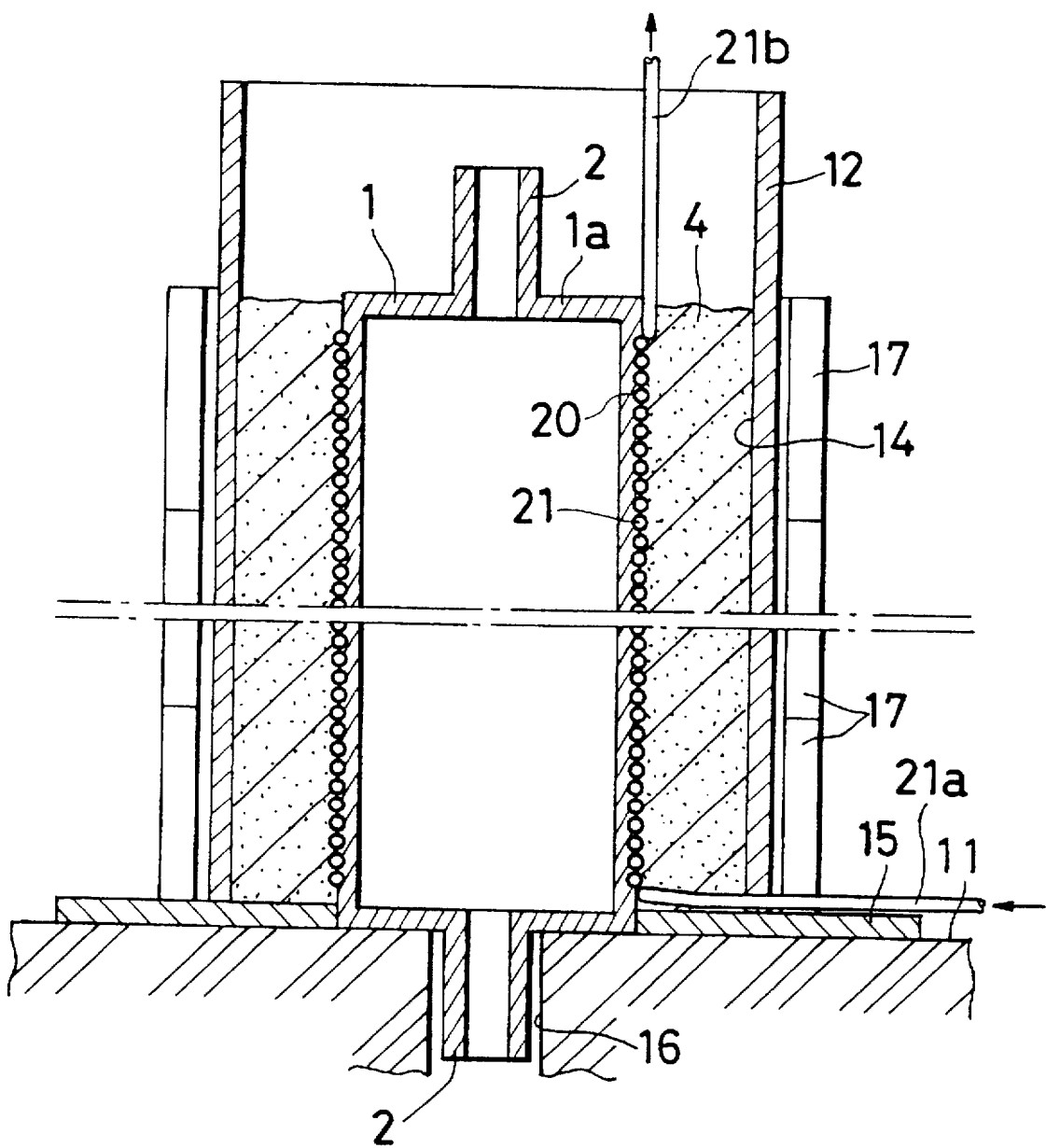
FIGS. 9 to 14 show a third mode of practicing the process of the invention stepwise.
Figure 10:
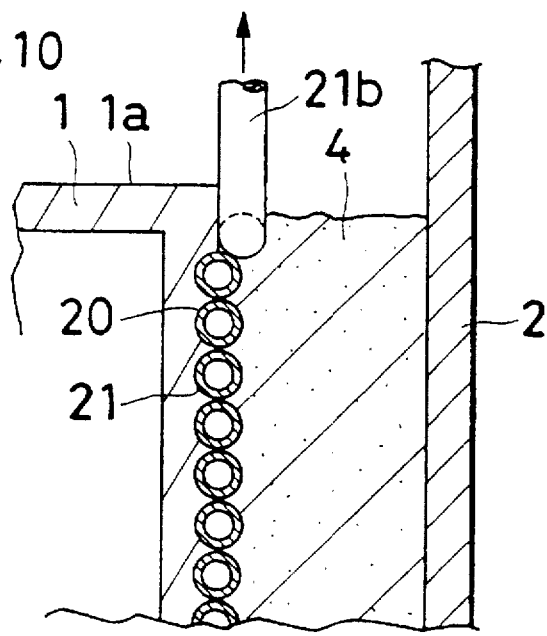
Figure 13:
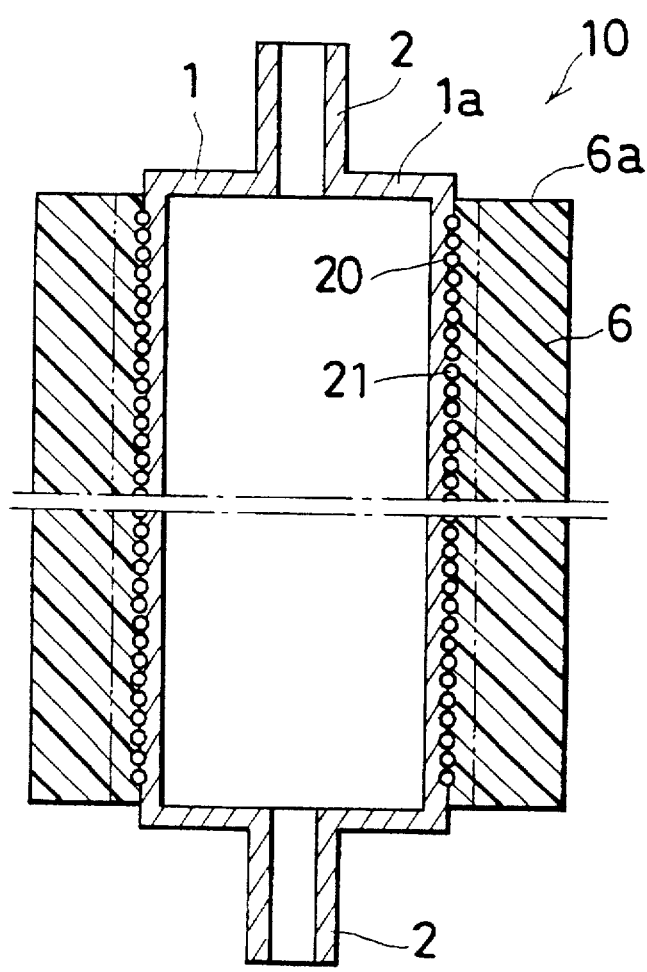
Figure 14:
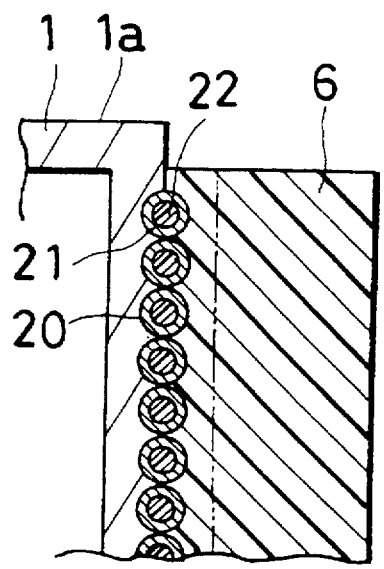

With reference to FIGS. 9 and 10, a helical pipe fitting groove 20 is formed in the outer peripheral surface of the metal roll core 1 with a pitch approximately coinciding with the outside diameter of the cooling-heating pipe 21. Preferably, the groove 20 has such a depth that one-half portion of the pipe 21 is snugly fittable in the groove.

The cooling-heating pipe 21 is wound around the roll core 1 by fitting one end portion 21a of the pipe 21 into the groove 20 first at one end of the core 1 toward one shaft portion 2 thereof, continuously fitting the pipe into the other portion of the groove 20 helically and taking out the other end portion 21b of the pipe 21 from the groove 20 at the other core end toward the other shaft portion 2.

Preferably, the pipe 21 is fastened to the metal roll core 1 by winding a metal wire or the like around the portions of the core 1 where the starting portion and the tail portion of the pipe 21 are fitted around the core 1. The pipe 21 is fastened alternatively with use of a woven fabric tape impregnated with a thermosetting resin instead of the wire by winding the tape around the winding of pipe 21 while tensioning the tape, and curing the resin.

It is also desired to apply an adhesive to the surface of the roll core 1 defining the helical groove 20 to bond the fitting half portion of the pipe 21 with the adhesive.

Other means may be used for fastening the cooling-heating pipe 21 to the roll core.

The pipe 21 to be used is, for example, an aluminum, copper, brass or like metal pipe, poly-carbonate resin, polyethylene or like resin pipe, rubber pipe or the like. Of these examples, the metal pipe is preferable to use from the viewpoint of water resistance and pressure resistance. In the case where a metal pipe of relatively low strength, resin pipe or rubber pipe is used, a liquid thermosetting resin material is cast into the helical pipe in the final stage of production of the hard roll, followed by curing of the resin to form a reinforcing filling layer inside the helical pipe.

In cross section, the cooling-heating pipe 21 is, for example, circular, elliptical, oval or square. For example when circular in cross section, the pipe 21 to be used is, for example, about 3.0 to 10.0 mm in outside diameter and about 0.2 to 1.5 mm in wall thickness. The cross sectional shape and size of the pipe 21 can be determined suitably insofar as the pipe will not impair the properties of the hard roll product.

On the other hand, the helical pipe fitting groove 20 to be formed in the outer peripheral surface of the metal roll core 1 can be of a cross sectional shape corresponding to one-half of the cross sectional shape of the pipe 21. In cross section, the groove is, for example, semicircular, semi-elliptical, semi-oval or one-half of a square. It is especially desirable that the groove 20 be of a semicircular cross section because the groove is then less likely trap air therein and renders the pipe windable easily.

The adhesive to be applied to the helical grooved surface of the roll core 1 for bonding the cooling-heating pipe 21 to the core is preferably an epoxy resin, unsaturated polyester resin, diallyl phthalate resin or like synthetic resin adhesive, or rubber adhesive.

The metal roll core 1 having the cooling-heating pipe 21 fitting in the groove 20 and helically wound around its outer periphery in this way is disposed upright on a base 11 with its lower shaft portion 2 inserted in a shaft bore 16 of the base 11.

As is the case with the first mode of practice, a support plate 15 of required height for adjusting the roll surface length is disposed outside the core 1, and an outer layer forming outer mold 12 is disposed around the roll core 1 at a predetermined distance therefrom to form a resin material casting space 14 defined by the core 1 and the mold 12 and having an open upper end and a lower end closed with the support plate 15.

Except where the helical groove 20 is formed, the roll core 1 is preferably externally rough-surfaced as by sand-blasting.

Next, a liquid thermosetting resin material 4 is cast into the space 14.

Second Step

With reference to FIG. 9, the resin material 4 is subsequently heated by a heater 17 from outside the mold 12 to cure a major portion of the resin material 4 and form an outer layer resin intermediate body 5 as is the case with the first mode. However, the liquid thermosetting resin material is cooled from the roll core side by passing water or like cooling fluid through the helical pipe. Thus, the material 4 is cooled from the roll core side, for example, to −30° to 50° C., preferably 5° to 30° C., to hold the portion of resin material 4 on the surface of the roll core 1 viscous and liquid and leave a viscous liquid resin material layer 4a inside the outer layer resin intermediate body 5.

To inhibit the curing reaction of the liquid thermosetting resin material 4 cast into the space 14, it is desired to cast the liquid resin material 4 into the space 14 in the first step while cooling the material 4 from the roll core side by passing water or like cooling fluid through the helical pipe 21 and to continue the cooling of the first step by the helical pipe 21 in the second step to thereby hold the portion of resin material 4 on the surface of the roll core 1 viscous and liquid and leave the viscous liquid resin material layer 4a, whereby the autogenous exothermic reaction of the resin material 4 is prevented.

Third Step

Figure 11:
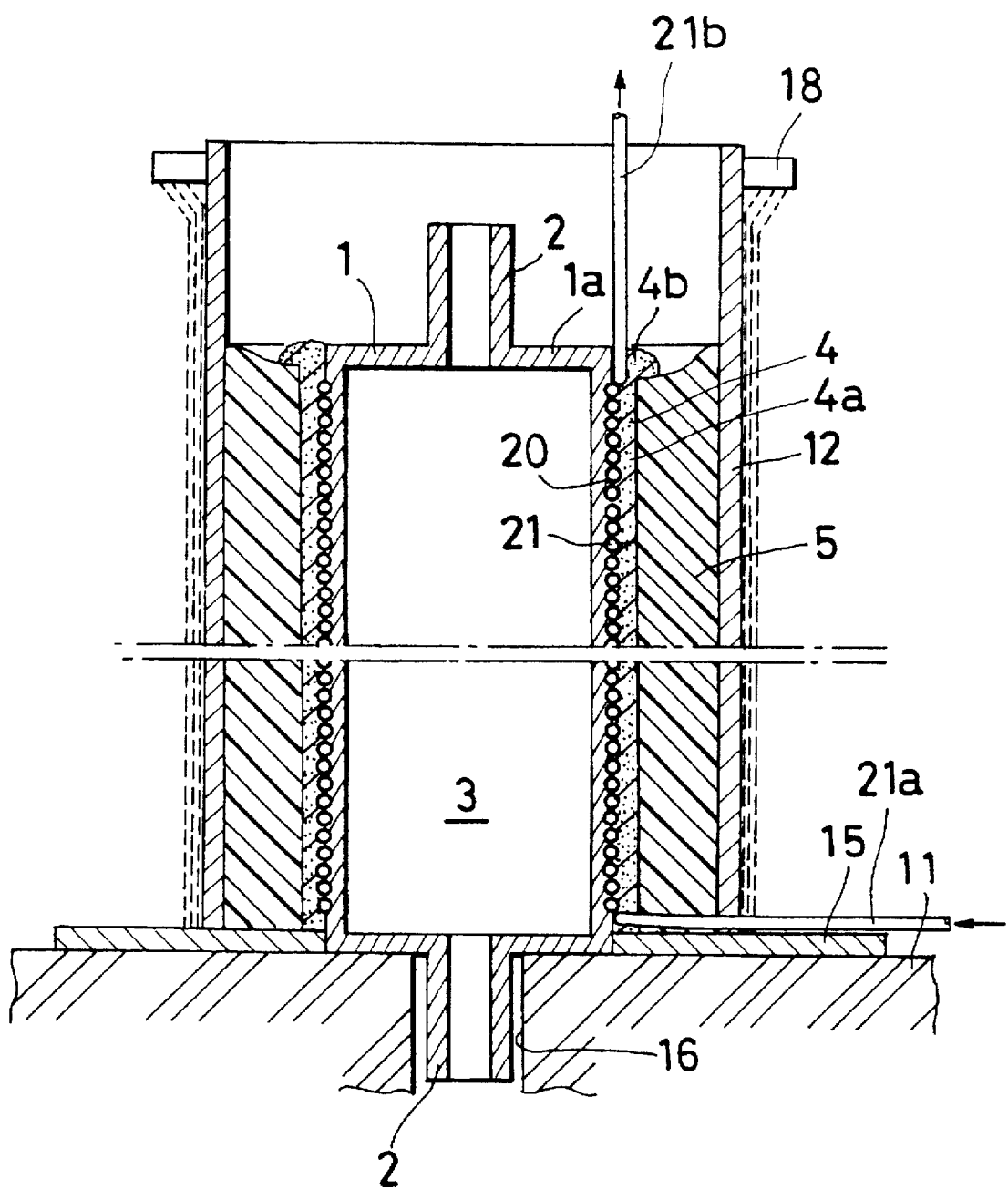

Next as shown in FIG. 11 and as in the case of the first mode, the outer layer resin intermediate body 5 is cooled from outside the outer mold 12 and maintained at a low temperature of about 60° C. by causing water or like cooling fluid to flow down the outer mold 12 from a hose 18 provided around the upper end of outer periphery of the mold 12 and having a multiplicity of orifices, whereby the body 5 is contracted chiefly by the thermal shrinkage thereof, allowing an excess 4b of the material of the viscous liquid resin material layer 4a inside the intermediate body to be forced out beyond the upper end of the body 5 with the contraction of the body 5.

Figure 12:
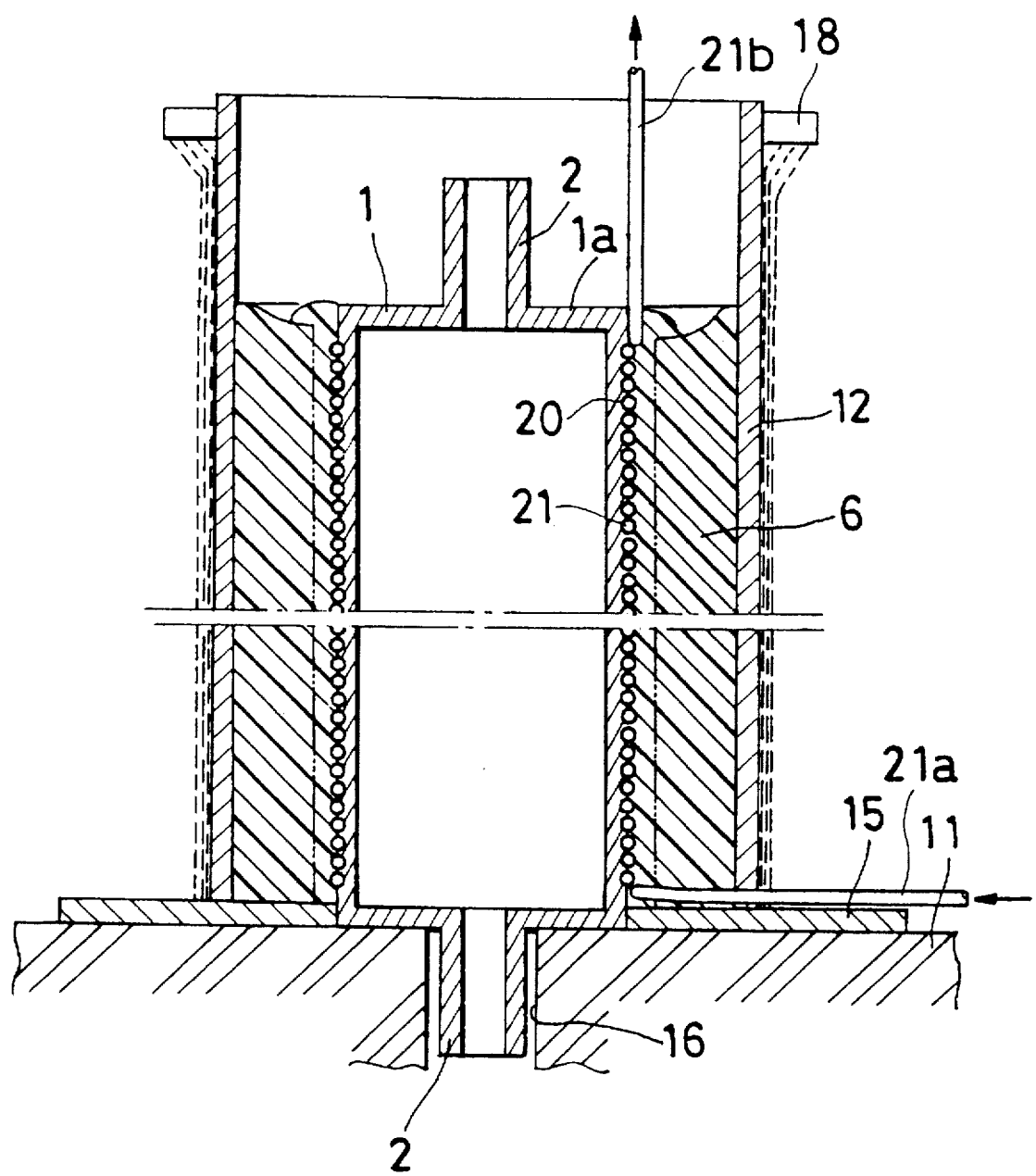

With reference to FIG. 12, hot water or like heating fluid is subsequently passed through the helical pipe 21 to heat the viscous liquid resin material layer 4a at about 60° C. from the roll core side and cure the remaining viscous liquid resin material 4, whereby a thermosetting resin outer layer 6 is formed as cured and joined to the outer periphery of the roll core 1 having the helical pipe 21 wound therearound.

When the inside temperature of the roll core 1 is further raised to 80° to 90° C. in the above step, promoted curing is effected, causing the layer 4a to be bonded to the core 1 having the helical pipe 21 with enhanced strength. If the temperature at which the intermediate body is cooled from outside the mold 12 is further lowered at the same time, the resin material layer 4a can be free of occurrence of thermal stress due to curing.

Fourth Step

When a metal pipe or like pipe which itself has a relatively high strength is used as the helical cooling-heating pipe 21, a hard roll 10 is obtained upon curing of the resin. The outer mold 12 is removed after the thermosetting resin outer layer 6 is formed around the outer periphery of the roll core 1 having the helical pipe 21, and the outer layer is cut at its upper and lower end portions by a cutting tool (not shown) to remove unnecessary portions of the resin, with the interior of the pipe 21 left as it is. The upper and lower end portions 21a, 21b of the helical pipe 21 are further removed, and the surface of the outer layer 6 is ground by a grinder to give the hard roll 10 outer layer end faces 6a which are approximately perpendicular to the roll core 1 (see FIG. 13).

On the other hand, when the helical cooling-heating pipe 21 used is a metal pipe having a relatively low strength, resin pipe or rubber pipe, a thermosetting resin material having a low viscosity, for example, of up to 4,000 cps is cast into the helical pipe 21 after the curing of the resin of the outer layer 6 to reinforce the helical pipe 21. The hose 18 is removed after the pipe 21 has been found filled up with the low-viscosity resin up to its upper end portion 21b, and the heater 17 is operated again to heat the resin in the pipe 21 at 50° to 60° C. and cure the resin. In this way, a reinforcing filling layer 22 is formed inside the helical pipe 21 (see FIG. 14).

The outer mold 12 is thereafter removed to obtain a hard roll 10, and the thermosetting resin outer layer 6 of the roll is cut at its upper and lower end portions by a cutting tool (not shown) to remove unnecessary portions of the resin. The upper and lower end portions 21a, 21b of the helical pipe 21 are removed, and the surface of the outer layer 6 is further ground by a grinder to give the hard roll 10 outer layer end faces 6a which are approximately perpendicular to the roll core 1. Finally a coating composition is applied to the upper and lower end faces 6a, 6a of the outer layer 6 which are nearly perpendicular to the roll core 1, whereby the upper and lower cut end faces of the helical pipe 21 are prevented from being exposed.

Although the illustrated metal roll core 1 is hollow, the roll can be solid in the case where the helical cooling-heating pipe 21 is used.

FIGS. 15 to 18 show a fourth mode of practicing the process of the invention stepwise.

In this mode of practice, a metal roll core 1 is provided around its outer periphery with a fiber-reinforced lower winding layer 23 which has a helical pipe fitting groove 20 in the outer peripheral surface thereof. A cooling-heating pipe 21 is helically wound as fitted in the groove 20.

First step

Figure 15:
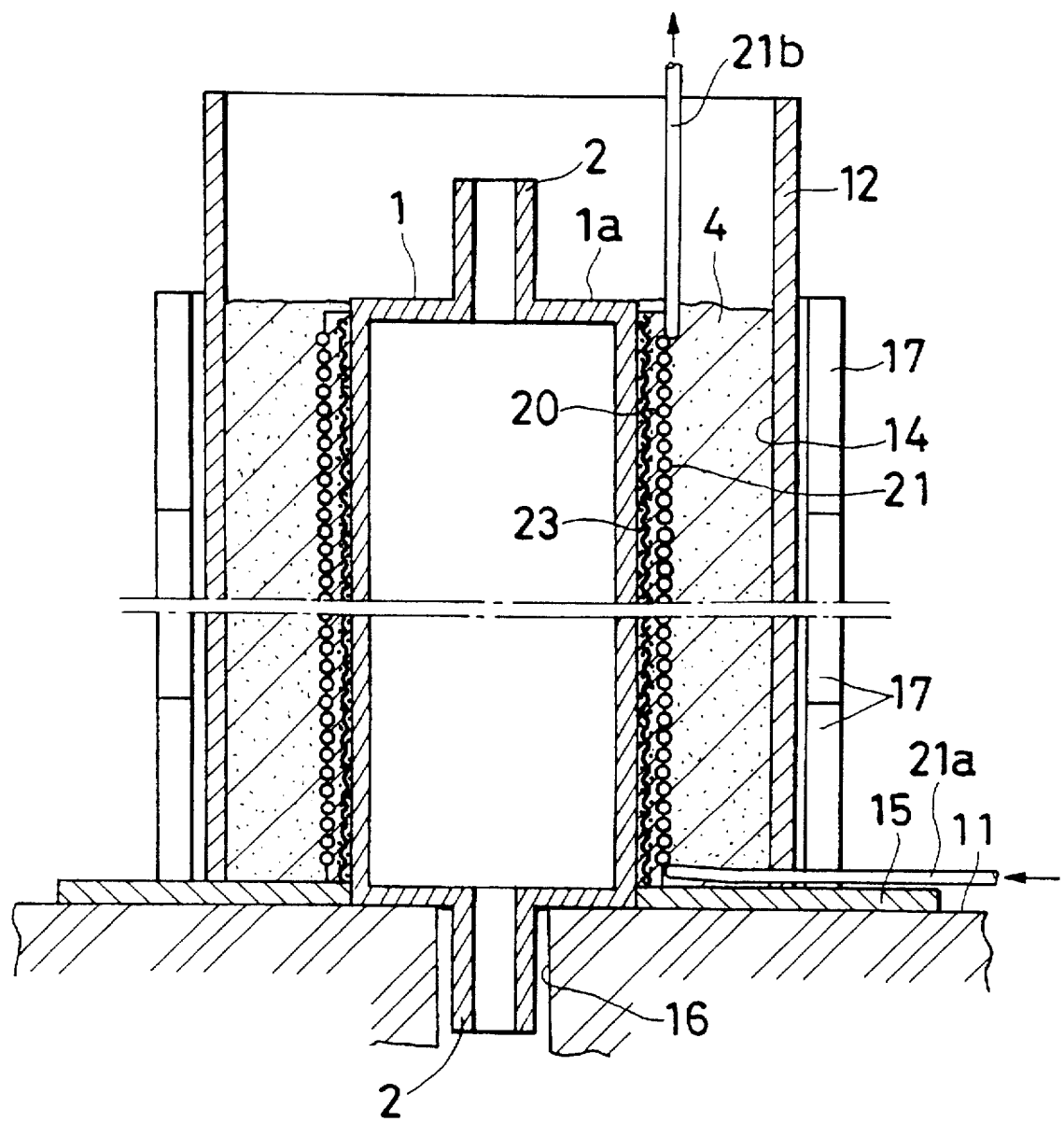
FIGS. 15 to 18 show a fourth mode of practicing the process of the invention stepwise.

With reference to FIG. 15, the fiber-reinforced lower winding layer 23 is made of a fiber material impregnated with a thermosetting resin and formed by winding the material around the outer peripheral surface of the roll core 1 to a thickness, for example, of 3 to 50 mm, preferably 6 to 25 mm. The outer periphery of the core 1 is preferably rough-surfaced as by sandblasting before winding.

The fiber material and thermosetting resin to be used for forming the winding layer 23 are the same as those used in the second mode described.

As in the case of the third mode described, the winding layer 23 around the metal roll core 1 is formed in its outer surface with a helical pipe fitting groove 20 with a pitch nearly equal to the outside diameter of the cooling-heating pipe 21. Preferably the groove 20 has such a depth that one-half portion of the pipe 21 snugly fits into the groove.

The cooling-heating pipe 21 is then wound around the lower winding layer 23 on the roll core 1 by fitting one end portion 21a of the pipe 21 into the groove 20 first at one end of the layer 23 on the core 1, continuously fitting the pipe into the other portion of the groove 20 helically and taking out the other pipe end portion 21b from the groove 20 at the other end of the layer 23 on the core 1.

Preferably, the pipe 21 is fastened to the winding layer 23 by winding a metal wire or the like around the starting portion and the tail portion of the winding of the pipe 21. The pipe 21 is fastened alternatively with use of a woven fabric tape impregnated with a thermosetting resin instead of the wire or the like by winding the tape around the winding of pipe 21 while tensioning the tape, and curing the resin.

It is also desired to apply an adhesive to the surface of the lower winding layer 23 on the roll core 1 defining the helical groove 20 to bond the fitting half portion of the pipe 21 with the adhesive.

Other means may be used for fastening the cooling-heating pipe 21 to the winding layer.

The cooling-heating pipe 21 to be used is the same as the one used in the third mode described.

The pipe 21 to be used is the same as the one used in the third mode in cross sectional shape and size. Further the helical pipe fitting groove 20 to be formed in the outer peripheral surface of the fiber-reinforced lower winding layer 23 around the metal roll core 1 may be of a cross sectional shape corresponding to one-half of the cross sectional shape of the pipe 21. The groove is, for example, semicircular, semi-elliptical, semi-oval or one-half of a square in cross section.

The adhesive to be applied to the helical grooved surface of the layer 23 on the core 1 for bonding the pipe 21 to the layer is preferably an epoxy resin, unsaturated polyester resin, diallyl phthalate resin or like synthetic resin adhesive, or rubber adhesive.

The metal roll core 1 having the cooling-heating pipe 21 fitting in the groove 20 of fiber-reinforced lower winding layer 23 and helically wound around its outer periphery in this way is disposed upright on a base 11 with its lower shaft portion 2 inserted in a shaft bore 16 of the base 11.

As is the case with the third mode of practice, a support plate 15 of required height for adjusting the roll surface length is disposed outside the core 1, and an outer layer forming outer mold 12 is disposed around the roll core 1 at a predetermined distance from the winding layer 23 thereon to form between the core 1 and the mold 12 a resin material casting space 14 having an open upper end and a lower end closed with the support plate 15.

Except where the helical groove 20 is formed, the lower winding layer 23 around the metal roll core 1 is preferably externally rough-surfaced as by sand-blasting.

Next, a liquid thermosetting resin material 4 is cast into the space 14.

Second Step

As shown in FIG. 15 and as in the case of the third mode described, the resin material 4 is then heated by a heater 17 from outside the outer mold 12 to cure a major portion of the resin material 4 and form an outer layer resin intermediate body 5, while the liquid thermosetting resin material is cooled from the roll core side by passing water or like cooling fluid through the helical pipe. Thus, the material 4 is cooled from the roll core side, for example, to −30° to 50° C., preferably to 5° to 30° C., to hold the portion of resin material 4 on the surface of the fiber-reinforced lower winding layer 23 on the core 1 viscous and liquid and leave a viscous liquid resin material layer 4a inside the outer layer resin intermediate body 5.

To inhibit the curing reaction of the liquid thermosetting resin material 4 cast into the space 14, it is desired to cast the material 4 into the space 14 in the first step while cooling the material 4 from the roll core side by passing water or like cooling fluid through the helical pipe 21 and to continue the cooling of the first step by the helical pipe 21 in the second step to thereby hold the portion of resin material 4 around the surface of the roll core viscous and liquid and leave the viscous liquid resin material layer 4a, whereby the autogenous exothermic reaction of the resin material 4 is prevented.

Third Step

Figure 16:
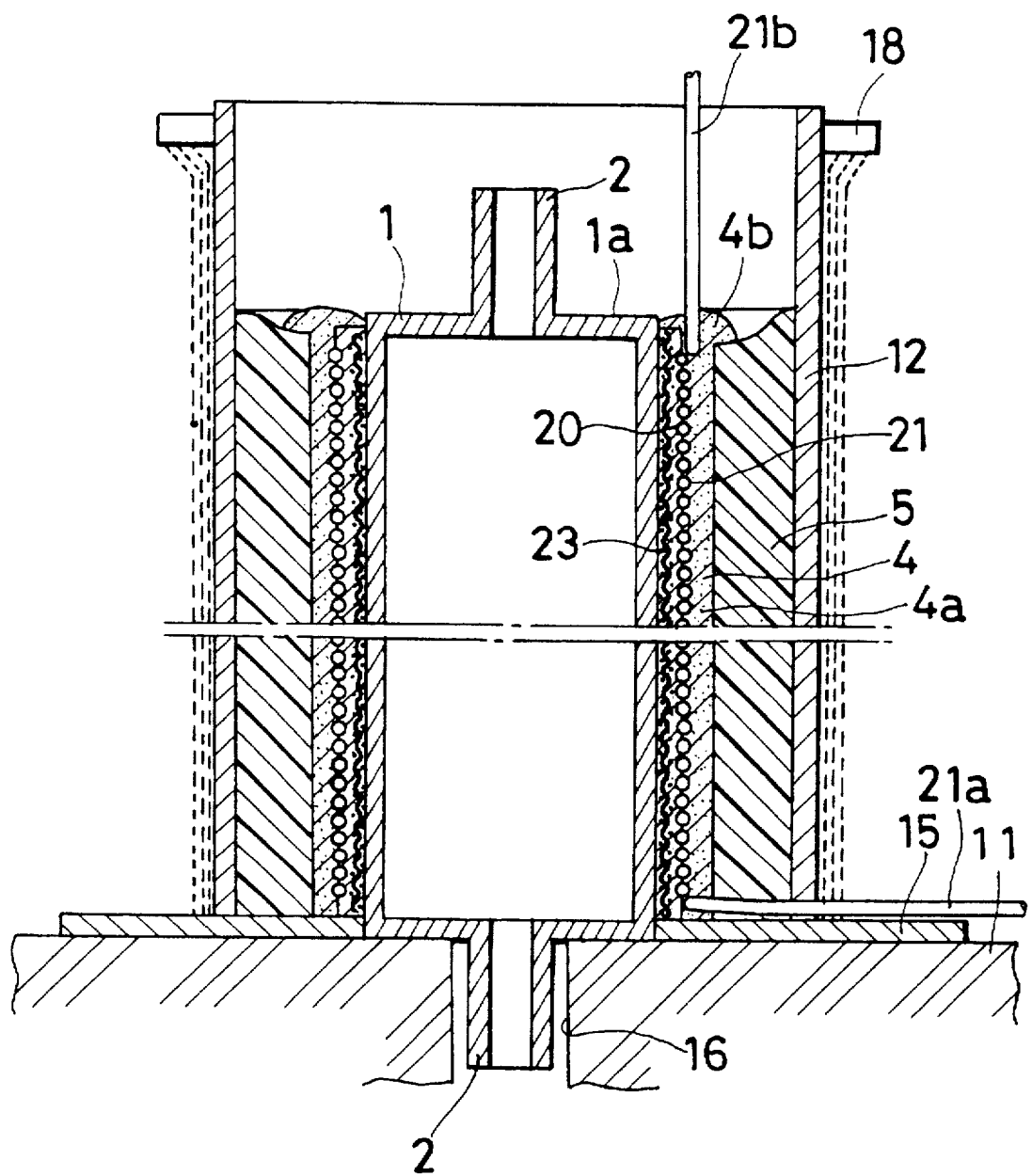

Next as shown in FIG. 16 and as in the case of the third mode, the outer layer resin intermediate body 5 is cooled from outside the outer mold 12 and maintained at a low temperature of about 60° C. by causing water or like cooling fluid to flow down the outer mold 12 from a hose 18 provided around the upper end of outer periphery of the mold 12 and having a multiplicity of orifices, whereby the body 5 is contracted chiefly by the thermal shrinkage thereof, allowing an excess 4b of the material of the viscous liquid resin material layer 4a inside the intermediate body to be forced out beyond the upper end of the body 5 with the contraction of the body 5.

Figure 17:
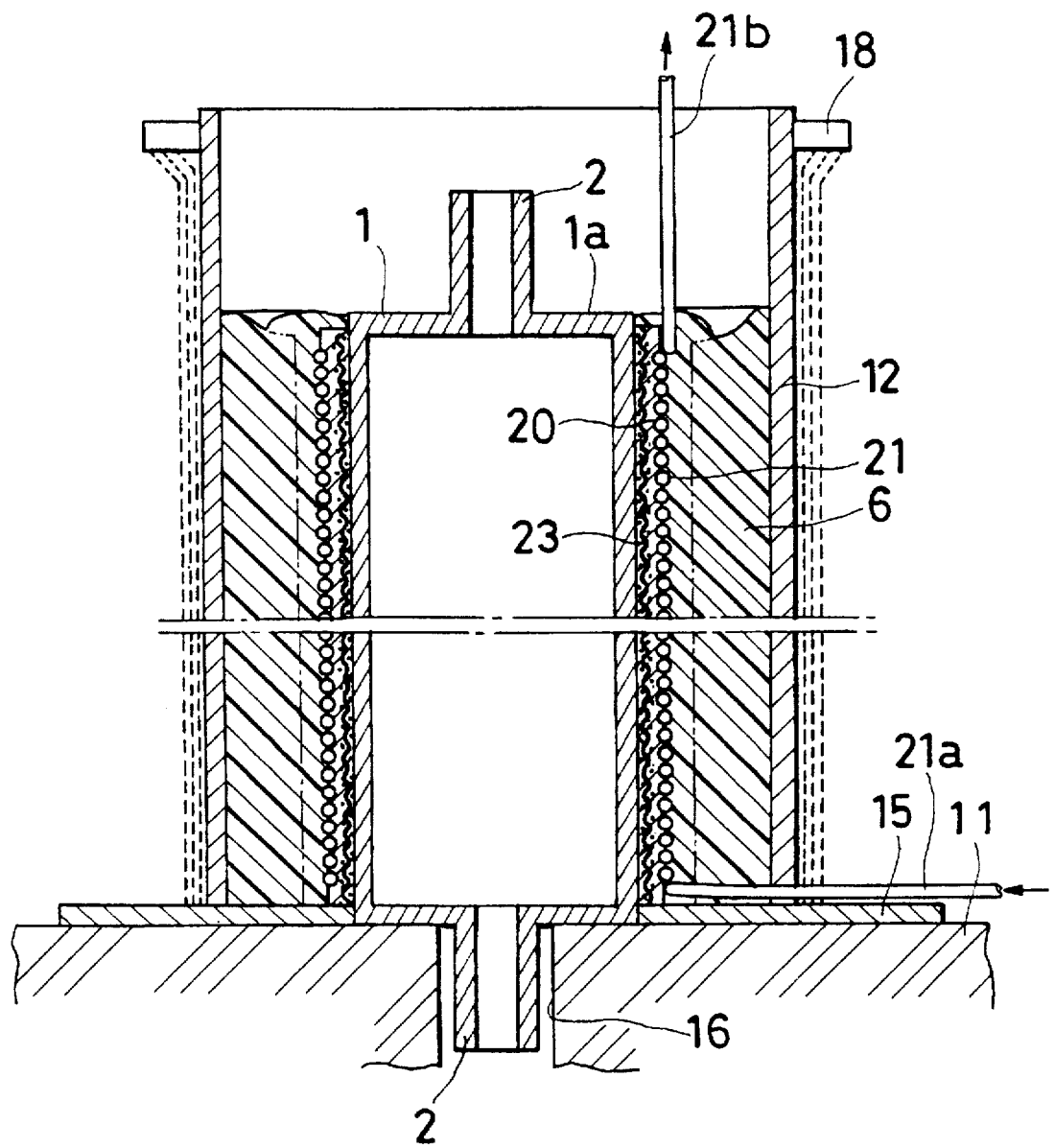
Figure 18:
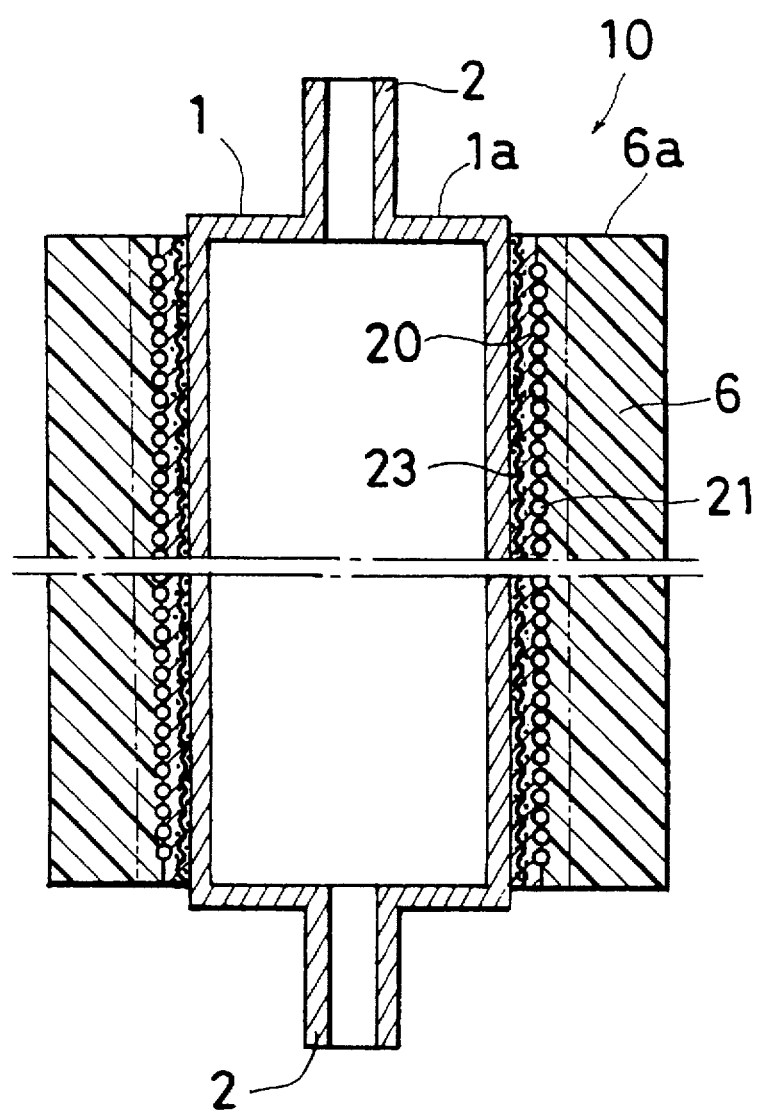

With reference to FIG. 17, hot water or like heating fluid is subsequently passed through the helical pipe 21 on the outer surface of the winding layer 23 to heat the viscous liquid resin material layer 4a at about 60° C. from the roll core side and cure the remaining viscous liquid resin material 4, whereby a thermosetting resin outer layer 6 is formed as cured and joined to the outer periphery of the roll core 1 having the winding layer 23 and the helical pipe 21 around the layer 23.

When the inside temperature of the roll core 1 is further raised to 80° to 90° C. in the above step, promoted curing is effected, causing the resin material layer 4a to be bonded with enhanced strength to the roll core 1 having the lower winding layer 23 and the helical pipe 21 on the layer 23. If the temperature at which the intermediate body is cooled from outside the mold 12 is further lowered at the same time, the resin material layer 4a can be free of occurrence of thermal stress due to curing.

Fourth Step

When a metal pipe or like pipe which itself has a relatively high strength is used as the helical cooling-heating pipe 21, a hard roll 10 is obtained on curing of the resin. The outer mold 12 is removed after the thermosetting resin outer layer 6 is formed around the outer periphery of the roll core 1 having the helical pipe 21, and the outer layer 16 is cut at its upper and lower end portions by a cutting tool (not shown) to remove unnecessary portions of the resin, with the interior of the pipe 21 left as it is. The upper and lower end portions 21a, 21b of the helical pipe 21 are further removed, and the surface of the outer layer 6 is ground by a grinder to give the hard roll 10 outer layer end faces 6a which are approximately perpendicular to the roll core 1 (see FIG. 18).

When the helical cooling-heating pipe 21 used is a metal pipe having a relatively low strength, resin pipe or rubber pipe, the curing of the resin of the outer layer 6 is followed by reinforcement of the pipe 21 as in the third mode described although not shown. For this purpose, a thermosetting resin material of low viscosity is cast into the pipe 21 and cured by heating to form a reinforcing filling layer 22 inside the helical pipe 21.

The outer mold 12 is thereafter removed to obtain a hard roll 10, and the fiber-reinforced lower winding layer 23 and the thermosetting resin outer layer 6 of the roll are cut at their upper and lower end portions by a cutting tool (not shown) to remove unnecessary portions of the layer 23 and the outer layer resin. The upper and lower end portions 21a, 21b of the helical pipe 21 are removed, and the surface of the outer layer 6 is further ground by a grinder to give the hard roll 10 outer layer end faces 6a which are approximately perpendicular to the roll core 1. Finally a coating composition is applied to the upper and lower end faces 6a, 6a of the outer layer 6 which are nearly perpendicular to the roll core 1, whereby the upper and lower cut end faces of the helical pipe 21 are prevented from being exposed.

Although the illustrated metal roll core 1 is hollow, the roll can be solid in the case where the helical cooling-heating pipe 21 is used as is the case with the third mode of practice described.

Next, examples of the present invention will be described with reference to the drawings.

EXAMPLE 1

A papermaking calender roll was produced by performing the steps of FIGS. 1 to 4 according to the first mode of practing the process of the invention.

First Step

First, an iron roll core 1 measuring 4722 mm in length, 480 mm in diameter and 3470 mm in surface length was rough-surfaced by sandblasting over the outer periphery. The roll core 1 was hollow and had shaft portions 2, 2 at its respective ends and a heating or cooling fluid passage 3 in its interior.

The iron roll core 1 was placed upright on the base 11 shown in FIG. 1, and a support plate 15 of required height was disposed outside the core 1 for adjusting the roll surface length. An outer layer forming outer mold 12 was disposed on the support plate 15 around the core 1 at a predetermined distance therefrom. Cooling water was passed through the passage 3 inside the roll core 1 to maintain the surface of the core 1 at about 20° C.

A liquid epoxy resin material 4 was then cast into the space 14 formed between the roll core 1 and the outer mold 12. The epoxy resin material 4 used comprised 100 parts by weight of the main agent, 24 parts by weight of a curing agent and 40 parts by weight of silica powder up to 44 μm in mean particle size.

Second Step

The epoxy resin material 4 was subsequently heated from outside the outer mold 12 by the heater 17 shown in FIG. 1 while raising the heating temperature stepwise to 100° C., 150° C. and 200° C., whereby a major portion of the material 4 was cured for the material to exhibit the properties of epoxy resin and form an outer layer resin intermediate body 5. The application of cooling water of the first step through the passage 3 inside the roll core 1 was continued to thereby hold the surface of the roll core 1 at about 20° C., keep the portion of resin material 4 on the surface viscous and liquid and leave a viscous liquid resin material layer 4a having a thickness of about 3 to about 4 mm inside the intermediate body 5.

Third Step

Next, cooling water was caused to flow down the outer mold 12 from a hose 18 provided at the upper end of the mold 12 as shown in FIG. 2 and having orifices to cool the intermediate body 5 from outside the mold 12 and maintain the body 5 at a low temperature of about 60° C., whereby the body 5 was contracted chiefly by the thermal shrinkage thereof, allowing an excess 4b of the material of the viscous liquid resin material layer 4a inside the intermediate body to be forced out beyond the upper end of the body 5 with the contraction thereof.

Next as shown in FIG. 3, hot water was passed through the passage 3 inside the roll core 1 to thereby heat the viscous liquid resin material layer 4a at about 60° C. from inside the core 1. Upon lapse of a predetermined period of time, the inside temperature of the roll core 1 was raised to about 80° to about 90° C. and, at the same time, the intermediate body 5 was cooled to about 20° C. to cure the remaining viscous liquid resin material 4 and form a cured epoxy resin outer layer 6 as joined to the outer periphery of the roll core 1.

Fourth Step

After the epoxy resin was cured, the outer mold 12 was removed to obtain a hard roll 10. The roll upper end portion which had an irregular shape owing to the curing of the epoxy resin outer layer 6 was cut by a cutting tool (not shown) to remove an unnecessary portion of the resin. The surface of the outer layer 6 was ground by a grinder to give the hard roll 10 an outer layer end face 6a which was nearly perpendicular to the core 1 (see FIG. 4).

With the hard roll 10 thus prepared, the epoxy resin outer layer 6 had an effective surface length which was shorter than the surface length of the roll core 1. The outer layer 6 was 3430 mm in effective surface length, 500 mm in outside diameter and 10 mm in thickness.

Performance Evaluation Test

To check the hard roll 10 thus produced for performance as to whether it was usable as a papermaking calender roll, a small hard roll 10 for a running test was prepared in exactly the same manner as in Example 1.

The iron roll core 1 of the small hard roll 10 for the running test was 700 mm in length, 200 mm in diameter and 200 mm in surface length. The epoxy resin outer layer 6 was 10 mm in thickness and 190 mm in effective surface length.

To use the small hard roll 10 as the papermaking calender roll, two steel rolls (not shown) were used for the roll 10 which were iron rolls having a heater incorporated therein and measuring 700 mm in length, 190 mm in diameter and 210 mm in surface length.

The test hard roll 10 was disposed between the pair of steel rolls arranged one above the other. The heater of the steel roll was set at a temperature of 80° C. The heater was housed in each of the upper and lower steel rolls.

The test roll 10 of the invention was continuously subjected to a running test for four weeks in combination with the upper and lower steel rolls at a line pressure of 380 kg/cm and rotational speed of 400 r.p.m.

Consequently, the surface of the test roll 10 was found free from defacement or cracking due to the line pressure of the steel rolls, while no thermal damage was found in the epoxy resin outer layer 6 due to heat generation attributable to the running. The result reveals that the hard roll 10 of Example 1 is satisfactory usable as an actual papermaking calender roll.

EXAMPLE 2

A papermaking calender roll was produced by successively performing the steps of FIGS. 5 to 8 according to the second mode of practicing the process of the invention.
First Step First, an iron roll core 1 measuring 3460 mm in length, 480 mm in diameter and 3400 mm in surface length was rough-surfaced by sandblasting over the outer periphery. The roll core 1 was hollow and had shaft portions 2, 2 at its respective ends and a heating or cooling fluid passage 3 in its interior.

Next, a fiber material impregnated with an epoxy resin was wound around the outer periphery of the iron roll core 1 to form a fiber-reinforced lower winding layer 7 having a thickness of 6 mm. The epoxy resin used was a mixture of 100 parts by weight of the main agent, 24 parts by weight of a curing agent and 40 parts by weight of silica powder having a mean particle size of up to 44 μm. The fiber winding comprised glass roving impregnated with the silica-incorporating epoxy resin and wound around the core 1, and a glass cloth tape impregnated with the same epoxy resin and subsequently wound around the roving layer. The epoxy resin was cured at 100° C.

Next, the roll core 1 was placed upright on the base 11 shown in FIG. 5, an outer layer forming outer mold 12 was disposed around the core 1 at a predetermined distance therefrom, and an outer layer forming inner mold 13 was disposed on the upper end of the roll core 1 as if extending therefrom. Cooling water was then passed through the passage 3 inside the core 1. A liquid epoxy resin material 4 was cast into a space 14 formed between the outer mold 12 and the combination of core 1 and inner mold 13, to a level above the upper end of the roll core 1. The epoxy resin used, which was the same as the one stated above, was a mixture of 100 parts by weight of the main agent, 24 parts by weight of a curing agent and 40 parts by weight of silica powder up to 44 μm in mean particle size.

Second Step

The epoxy resin material 4 was subsequently heated from outside the outer mold 12 by the heater 17 shown in FIG. 5 while raising the heating temperature stepwise to 100° C., 150° C. and 200° C., whereby a major portion of the material 4 was cured for the material to exhibit the properties of epoxy resin and form an outer layer resin intermediate body 5. The application of cooling water of the first step through the passage 3 inside the core 1 was continued to thereby maintain the surface of the core 1 at about 20° C., hold the portion of resin material 4 on the surface viscous and liquid and leave a viscous liquid resin material layer 4a having a thickness of about 3 to about 4 mm inside the intermediate body 5.
Third Step Next, cooling water was caused to flow down the outer mold 12 from a hose 18 provided at the upper end of the mold 12 as shown in FIG. 6 and having orifices to cool the intermediate body 5 from outside the mold 12 and maintain the body 5 at a low temperature of about 60° C., whereby the body 5 was contracted chiefly by the thermal shrinkage thereof, allowing an excess 4b of the material of the viscous liquid resin material layer 4a inside the intermediate body to be forced out beyond the upper end of the body 5 with the contraction thereof.

Next as seen in FIG. 7, hot water was passed through the passage 3 inside the roll core 1 to thereby heat the viscous liquid resin material layer 4a at about 60° C. from inside the core 1. Upon lapse of a predetermined period of time, the inside temperature of the roll core 1 was raised to about 80° to about 90° C. and, at the same time, the intermediate body 5 was cooled to about 20° C. to cure the remaining viscous liquid resin material 4 and form a cured epoxy resin outer layer 6 as joined to the outer periphery of the roll core 1.
Fourth Step After the epoxy resin was cured, the outer mold 12 was removed to obtain a hard roll 10. With the present example, the epoxy resin material 4 was cast in the first step to a level above the upper end of the roll core 1, so that the epoxy resin outer layer 6 was formed to a level above the upper end face 1a of the core 1. The upper end portion of the outer layer 6 which had an irregular shape owing to the curing thereof was cut by a cutting tool (not shown) to remove an unnecessary portion of the resin, and the surface of the outer layer 6 was ground by a grinder to form an outer layer end face 6a which was flush with the upper end face 1a of the roll core 1. The resin outer layer 6 of the hard roll 10 thus prepared had an effective surface length equal to the surface length of the roll core 1 (see FIG. 8).

The epoxy resin outer layer 6 of the hard roll 10 thus obtained was 3400 mm in effective surface length, 520 mm in outside diameter and 20 mm in thickness.
Performance Evaluation Test To check the hard roll 10 thus produced for performance as to whether it was usable as a papermaking calender roll, a small hard roll 10 for a running test was prepared in the same manner as in Example 2.

The iron roll core 1 of the small hard roll 10 for the running test was 700 mm in length, 200 mm in diameter and 200 mm in surface length. The epoxy resin outer layer 6 was 14 mm in thickness and 200 mm in effective surface length. The fiber-reinforced lower winding layer 7 was 6 mm in thickness.

To use the test hard roll 10 as the papermaking calender roll, two steel rolls (not shown) were used for the roll 10 which were iron rolls having a heater incorporated therein and measuring 700 mm in length, 200 mm in diameter and 200 mm in surface length.

The test hard roll 10 was disposed between the pair of steel rolls as arranged one above the other. The heater of the steel roll was set at a temperature of 80° C. The heater was housed in each of the upper and lower steel rolls.

The test roll 10 of the invention was continuously subjected to a running test for four weeks in combination with the upper and lower steel rolls at a line pressure of 380 kg/cm and rotational speed of 400 r.p.m.

Consequently, the surface of the test roll 10 was found free from defacement or cracking due to the line pressure of the steel rolls, while no thermal damage was found in the epoxy resin outer layer 6 due to heat generation attributable to the running. The result reveals that the hard roll 10 of Example 2 is fully usable as an actual papermaking calender roll.

EXAMPLE 3

A papermaking calender roll was produced by successively performing the steps of FIGS. 9 to 14 according to the third mode of practicing the process of the invention.

First Step

A helical pipe fitting groove 20 was formed in the outer peripheral surface of an iron roll core 1 with a pitch nearly equal to the outside diameter of a cooling-heating pipe 21. The roll core 1 was 4722 mm in length, 480 mm in diameter and 3470 mm in surface length. The groove 20 had such a depth that one-half portion of the pipe 21 exactly fitted into the groove. The groove was semicircular in cross section.

The pipe 21 was made of copper, had an outside diameter of 6.0 mm and was circular in cross section. The pipe 21 was then wound around the roll core 1 by fitting one end portion 21a thereof into the groove 20 first at one end of the core 1 toward one shaft portion 2 thereof, continuously fitting the pipe into the other portion of the groove 20 helically and taking out the other end portion 21b of the pipe 21 from the groove 20 at the other core end toward the other shaft portion 2.

An epoxy resin adhesive was applied to the core surface defining the helical groove 20 before winding to bond the fitting half portion of the pipe 21 to the core 1, and a metal wire (not shown) was wound around the starting portion and tail portion of the winding of the pipe 21 around the core 1 to fix the pipe 21.

The metal roll core 1 having the cooling-heating pipe 21 thus fitted in the groove 20 and helically wound around its outer periphery was placed up-right on a base 11, with the lower shaft portion 2 of the core 1 inserted in a shaft bore 16 of the base 11 as shown in FIG. 9.

As in the case of Example 1, a support plate 15 of required height for adjusting the roll surface length was provided around the roll core 1, and an outer layer forming outer mold 12 was disposed around the core 1 at a predetermined distance therefrom to form a resin material casting space 14 defined by the core 1 and the outer mold 12 and having an open upper end and a lower end closed with the support plate 15.

The same liquid epoxy resin material 4 as used in Example 1 was then cast into the space 14.

Second Step

As shown in FIG. 9, the epoxy resin material 4 was subsequently heated by a heater 17 from outside the outer mold 12 to cure a major portion of the epoxy resin material 4 and form an outer layer resin intermediate body 5. The liquid epoxy resin material was cooled from the roll core side by passing a cooling fluid, i.e., water, through the helical pipe 21. Thus, the material was cooled to 20° C. from the core side to hold the portion of resin material 4 on the surface of the core 1 viscous and liquid and leave a viscous liquid resin material layer 4a inside the outer layer resin intermediate body 5.

To inhibit the curing reaction of the liquid epoxy resin material 4 cast into the space 14, the liquid epoxy resin material 4 was cast into the space 14 in the first step while cooling the material 4 from the roll core side by passing the cooling fluid, comprising water, through the helical pipe 21, and the cooling of the first step by the helical pipe 21 was continued in the second step to thereby hold the portion of resin material 4 on the surface of the roll core 1 viscous and liquid and leave the viscous liquid resin material layer 4a, whereby the autogenous exothermic reaction of the material 4 was prevented.

Third Step

Next as shown in FIG. 11, the outer layer resin intermediate body 5 was cooled from outside the outer mold 12 and maintained at a low temperature of about 60° C. by causing a cooling fluid comprising water to flow down the mold 12 from a hose 18 provided around the upper end of outer periphery of the mold 12 and having a multiplicity of orifices, whereby the body 5 was contracted chiefly by the thermal shrinkage thereof, allowing an excess 4b of the material of the viscous liquid resin material layer 4a inside the intermediate body to be forced out beyond the upper end of the body 5 with the contraction thereof.

As seen in FIG. 12, a heating fluid comprising hot water was thereafter passed through the helical pipe 21 to heat the viscous liquid resin material layer 4a at about 60° C. from the roll core side and cure the remaining viscous liquid resin material 4, whereby a cured epoxy resin outer layer 6 was formed as joined to the outer periphery of the roll core 1 having the helical pipe 21 wound therearound.

Fourth Step

After the epoxy resin outer layer 6 was formed around the roll core 1 having the helical pipe 21 by the curing of the resin, an epoxy resin material having a viscosity of 3,000 cps was cast into the helical pipe 21 to reinforce the pipe 21. The hose 18 was removed after the pipe 21 was found filled up with the resin up to its upper end portion 21b, and the heater 17 was operated again to cure the resin in the pipe 21 by heating at 50° to 60° C. and form a reinforcing filling layer 22 (see FIG. 14).

The outer mold 12 was thereafter removed to obtain a hard roll 10, and the epoxy resin outer layer 6 of the roll was cut at its upper and lower end portions by a cutting tool (not shown) to remove unnecessary portions of the resin. The upper and lower end portions 21a, 21b of the helical pipe 21 were removed, and the surface of the outer layer 6 further ground by a grinder to give the hard roll 10 outer layer end faces 6a which were approximately perpendicular to the roll core 1. Finally a coating composition was applied to the upper and lower end faces 6a, 6a of the outer layer 6 which were nearly perpendicular to the core 1.

With the hard roll 10 thus obtained, the epoxy resin outer layer 6 had an effective surface length which was shorter than the surface length of the roll core 1. The outer layer 6 was 3430 mm in effective surface length, 500 mm in outside diameter and 10 mm in thickness.

Performance Evaluation Test

To check the hard roll 10 thus prepared for performance as to whether it was usable as a papermaking calender roll, a small hard roll 10 for a running test was prepared in exactly the same manner as in Example 3.

The test hard roll 10 was tested for the evaluation of performance by exactly the same method as in Example 1. The test roll 10 of the invention was disposed between a pair of upper and lower steel rolls and continuously subjected to a running test for four weeks in combination with the upper and lower steel rolls at a line pressure of 380 kg/cm and rotational speed of 400 r.p.m.

As a result, the surface of the test roll 10 was found free from defacement or cracking due to the line pressure of the steel rolls, while no thermal damage was found in the epoxy resin outer layer 6 due to heat generation attributable to the running. The result indicates that the hard roll 10 of Example 3 is fully usable as an actual papermaking calender roll.

EXAMPLE 4

A papermaking calender roll was produced by successively performing the steps of FIGS. 15 to 18 according to the fourth mode of practicing the process of the invention.
First Step First, an iron roll core 1 measuring 3460 mm in length, 480 mm in diameter and 3400 mm in surface length was rough-surfaced by sandblasting over the outer periphery. The roll core 1 had shaft portions 2, 2 at its respective ends.

Next, a fiber material impregnated with an epoxy resin was wound around the outer periphery of the iron roll core 1 to form a fiber-reinforced lower winding layer 23 having a thickness of 8 mm. As in Example 2 above, the epoxy resin used was a mixture of 100 parts by weight of the main agent, 24 parts by weight of a curing agent and 40 parts by weight of silica powder having a mean particle size of up 44 μm. The fiber material was wound around the roll core 1 in the same manner as in Example 2.

As in the case of the third mode described, the winding layer 23 around the metal core 1 was formed in its outer surface with a helical pipe fitting groove 20 with a pitch nearly equal to the outside diameter of a cooling-heating pipe 21. The groove 20 has such a depth that one-half portion of the pipe 21 snugly fitted into the groove. The groove was semicircular in cross section.

The pipe 21 was made of copper, had an outside diameter of 6.0 mm and was circular in cross section. The pipe 21 was then wound around the lower winding layer 23 on the roll core 1 by fitting one end portion 21a of the pipe 21 into the groove 20 first at one end of the layer 23 on the core 1, continuously fitting the pipe into the other portion of the groove 20 helically and taking out the other pipe end portion 21b from the groove 20 at the other end of the layer 23 on the core 1.

As in the case of Example 3, an epoxy resin adhesive was applied to the surface of the layer 23 defining the groove 20 before winding to bond the fitting half portion of the pipe 21 to the layer 23, and a metal wire (not shown) was wound around the starting portion and tail portion of the pipe winding around the core 1 to fix the pipe 21.

The metal roll core 1 having the cooling-heating pipe 21 thus fitted in the groove 20 of the winding layer 23 and helically wound around its outer periphery was placed upright on a base 11, with the lower shaft portion 2 of the core 1 inserted in a shaft bore 16 of the base 11 shown in FIG. 15.

As in the case of Example 1, a support plate 15 of required height for adjusting the roll surface length was provided around the roll core 1, and an outer layer forming outer mold 12 was disposed around the core 1 at a predetermined distance therefrom to form a resin material cast space 14 defined by the core 1 and the outer mold 12 and having an open upper end and a lower end closed with the support plate 15.

The same liquid epoxy resin material 4 as used in Example 1 was then cast into the space 14.

Second Step

As shown in FIG. 15, the epoxy resin material 4 was subsequently heated by a heater 17 from outside the outer mold 12 to cure a major portion of the epoxy resin material 4 and form an outer layer resin intermediate body 5, while the liquid epoxy resin material was cooled from the roll core side by passing a cooling fluid comprising water through the helical pipe 21. Thus, the material was cooled to 20° C. from the roll core side to hold the portion of resin material 4 on the surface of the winding layer 23 on the core 1 viscous and liquid and leave a viscous liquid resin material layer 4a inside the intermediate body 5.

To inhibit the curing reaction of the liquid epoxy resin material 4 cast into the space 14, the liquid epoxy resin material 4 was cast into the space 14 in the first step while cooling the material 4 from the roll core side by passing the cooling fluid comprising water through the helical pipe 21, and the cooling of the first step by the pipe 21 was continued in the second step to thereby hold the portion of resin material 4 on the surface of the roll core 1 viscous and liquid and leave the viscous liquid resin material layer 4a, whereby the autogenous exothermic reaction of the material 4 was prevented.
Third Step Next as shown in FIG. 16, the outer layer resin intermediate body 5 was cooled from outside the outer mold 12 and maintained at a low temperature of about 60° C. by causing a cooling fluid comprising water to flow down the mold 12 from a hose 18 provided around the upper end of outer periphery of the mold 12 and having a multiplicity of orifices, whereby the body 5 was contracted chiefly by the thermal shrinkage thereof, allowing an excess 4b of the material of the viscous liquid resin material layer 4a inside the intermediate body to be forced out beyond the upper end of the body 5 with the contraction thereof.

As seen in FIG. 17, a heating fluid comprising hot water was thereafter passed through the helical pipe 21 to heat the viscous liquid resin material layer 4a at about 60° C. from the roll core side and cure the remaining viscous liquid resin material 4, whereby a cured epoxy resin outer layer 6 was formed as joined to the outer periphery of the roll core 1 having the lower winding layer 23 and the helical pipe 21 wound therearound.
Fourth Step After the epoxy resin outer layer 6 was formed around the roll core 1 having the helical pipe 21 by the curing of the resin, an epoxy resin material having a viscosity of 3,000 cps was cast into the helical pipe 21 to reinforce the pipe 21. The hose 18 was removed after the pipe 21 was found filled up with the resin up to its upper end portion 21b, and the heater 17 was operated again to cure the resin in the pipe 21 by heating at 50° to 60° C. and form a reinforcing filling layer 22.

The outer mold 12 was thereafter removed to obtain a hard roll 10, and the lower winding layer 23 and the epoxy resin outer layer 6 of the roll were cut at their upper and lower end portions by a cutting tool (not shown) to remove unnecessary portions of the winding layer 23 and the outer layer resin. The upper and lower end portions 21a, 21b of the helical pipe 21 were removed, and the surface of the outer layer 6 further ground by a grinder to give the hard roll 10 outer layer end faces 6a which were approximately perpendicular to the roll core (see FIG. 18). Finally a coating composition was applied to the upper and lower end faces 6a, 6a of the outer layer 6 which were nearly perpendicular to the core 1.

With the hard roll 10 thus obtained, the epoxy resin outer layer 6 had an effective surface length which was shorter than the surface length of the roll core 1. The resin outer layer 6 was 3400 mm in effective surface length, 520 mm in outside diameter and 20 mm in thickness.

Performance Evaluation Test

To check the hard roll 10 thus prepared for performance as to whether it was usable as a papermaking calender roll, a small hard roll 10 for a running test was prepared in exactly the same manner as in Example 4.

The test hard roll 10 was tested for the evaluation of performance by exactly the same method as in Example 1. The test roll 10 of the invention was disposed between a pair of upper and lower steel rolls and continuously subjected to a running test for four weeks in combination with the upper and lower steel rolls at a line pressure of 380 kg/cm and rotation speed of 400 r.p.m.

As a result, the surface of the test roll 10 of Example 4 was found free from defacement or cracking due to the line pressure of the steel rolls, while no thermal damage was found in the epoxy resin outer layer 6 due to heat generation attributable to the running. The results indicates that the hard roll 10 of Example 4 is satisfactorily usable as an actual papermaking calender roll.

INDUSTRIAL APPLICABILITY

The present invention is advantageously applicable to a process for producing hard rolls for use in papermaking, fibers and various other industries, and especially to a process for producing hard rolls for use as elastic rolls including papermaking calender rolls, papermaking press rolls (inclusive of rolls substituted for papermaking stone rolls and rolls substituted for papermaking rubber rolls), fiber calender rolls, calender rolls for magnetic recording materials, etc.

We claim:

1. A process for producing a hard roll comprising: a first step of disposing an outer layer forming outer mold around a metal roll core provided in an upright position at a distance from a central axis of said metal roll core to form, between said metal roll core and said outer mold, a resin material casting space having a closed lower end and an open upper end and casting a liquid thermosetting resin material into said resin material casting space;

a second step of heating said liquid thermosetting resin material from outside said outer mold to cure a major portion of said liquid thermosetting resin material and form an outer layer resin intermediate body, while cooling said liquid thermosetting resin material from an outer periphery of said metal roll core to hold a portion of said liquid thermosetting resin material, adjacent said outer periphery of said metal roll core, in a viscous liquid state, thereby providing a viscous liquid resin material layer between said outer layer resin intermediate body and said outer periphery of said metal roll core;

a third step of subsequently cooling, from outside said outer mold, said outer layer resin intermediate body which is still contained in said resin material casting space to contract said outer layer resin intermediate body chiefly by thermal shrinkage of said outer layer resin intermediate body and allowing an excess of said liquid thermosetting resin material of said viscous liquid resin material layer between said outer layer resin intermediate body and said outer periphery of said metal roll core to be forced out beyond an upper end of said outer layer resin intermediate body with a contraction of said outer layer resin intermediate body toward said outer periphery of said metal roll core, while heating a remaining portion of said liquid thermosetting resin material at said outer periphery of said metal roll core to cure said remaining portion of said liquid thermosetting resin material and form a cured thermosetting resin outer layer which is bonded to said outer periphery of said metal roll core, thereby forming said hard roll; and a fourth step of cutting at least an upper end portion of said cured thermosetting resin outer layer to form an outer layer end face approximately perpendicular to said metal roll core.

2. The process of forming a hard roll as defined in claim 1, wherein said step of cooling said liquid thermosetting resin material from said outer periphery of said metal roll core is initiated in said first step prior to said casting step and continues through said second step.

3. The process for forming a hard roll as defined in claim 1, wherein said metal roll core is hollow and has a cooling and heating fluid passage in an interior thereof and upper and lower end shaft portions formed respectively with a fluid outlet and a fluid inlet in communication with said cooling and heating fluid passage, wherein said step of cooling said liquid thermosetting resin material from said outer periphery of said metal roll core in said second step comprises passing a cooling fluid through said cooling and heating fluid passage in said interior of said metal roll core; and wherein said step of heating said remaining portion of said liquid thermosetting resin material from said outer periphery of said metal roll core in said third step comprises passing a heating fluid through said cooling and heating fluid passage to provide said cure of said remaining portion of said liquid thermosetting resin material.

4. The process for forming a hard roll as defined in claim 3, wherein said first step further includes providing said metal roll core with a fiber-reinforced lower winding layer on said outer periphery thereof.

5. The process for forming a hard roll as defined in claim 1, wherein a helical cooling-heating pipe for passing a cooling fluid or a heating fluid therethrough is wound around said outer periphery of said metal roll core in said first step, wherein said step of cooling said liquid thermosetting resin material from said outer periphery of said metal roll core in said second step comprises passing said cooling fluid through said helical cooling-heat pipe, wherein said step of heating said remaining portion of said viscous liquid resin material from said outer periphery of said metal roll core in said third step comprises passing said heating fluid through said helical cooling-heating pipe to provide said cure of said remaining portion of said liquid thermosetting resin material, and forming outer layer end faces approximately perpendicularly to said metal roll core in said fourth step by cutting said cured thermosetting resin outer layer at upper and lower end portions to form cut upper and lower end portions, and removing said cut upper and lower end portions.

6. The process for producing a hard roll as defined in claim 5, wherein said metal roll core has a helical pipe fitting groove in a circumferential surface of said outer periphery, and said helical cooling-heating pipe is helically wound around said outer periphery of said metal roll core by fitting said helical cooling-heating pipe in said helical pipe fitting groove.

7. The process for producing a hard roll as defined in claim 5, wherein a fiber-reinforced lower winding layer is provided around said outer periphery of said metal roll core and said metal roll core has a helical pipe fitting groove formed in a circumferential surface of said outer periphery, and said helical cooling-heating pipe is helically wound around said outer periphery of said metal roll core by fitting said helical cooling-heating pipe in said helical pipe fitting groove.

8. The process for producing a hard roll as defined in claim 5, wherein said third step comprises, after said step of bonding, casting additional liquid thermosetting resin material into said helical cooling-heating pipe and curing said additional liquid thermosetting resin material to form a filling layer in an interior of said helical cooling-heating pipe.

9. The process for forming a hard roll as defined in claim 1, wherein said first step comprises disposing an outer layer forming inner mold on an upper end face of said metal roll core as an extension of said metal roll core in addition to said outer layer forming outer mold disposed around said metal roll core to form an extended resin material casting space defined by said extension of said metal roll core, said inner mold and said outer mold each having a closed lower end and an open upper end, wherein said casting step comprises casting said liquid thermosetting resin material into said extended resin material casting space to a level above said upper end face of said metal roll core, and wherein said fourth step of cutting said at least an upper end portion of said cured thermosetting resin outer layer comprises cutting to form said outer layer end face so that said outer layer end face is flush with said upper end face of said metal roll core.

10. The process for forming a hard roll as defined in claim 9, wherein said metal roll core in said first step has a fiber-reinforced lower winding layer on said outer periphery thereof.

11. A process for producing a hard roll comprising:

a first step of disposing an outer layer forming outer mold around a metal roll core provided in an upright position at a distance from a central axis of said metal roll core to form, between said metal roll core and said outer mold, a resin material casting space having a closed lower end and an open upper end and casting a liquid thermosetting resin material into said resin material casting space;

a second step of heating said liquid thermosetting resin material from outside said outer mold to cure a major portion of said liquid thermosetting resin material and form an outer layer resin intermediate body, while cooling said liquid thermosetting resin material from an outer periphery of said metal roll core to hold a portion of said liquid thermosetting resin material, adjacent said outer periphery of said metal roll core, in a viscous liquid state, thereby providing a viscous liquid resin material layer between said outer layer resin intermediate body and said outer periphery of said metal roll core;

a third step of subsequently cooling, from outside said outer mold, said outer layer resin intermediate body which is still contained in said resin material casting space to contract said outer layer resin intermediate body chiefly by thermal shrinkage of said outer layer resin intermediate body and allowing an excess of said liquid thermosetting resin material of said viscous liquid resin material layer between said outer layer resin intermediate body and said outer periphery of said metal roll core to be forced out beyond an upper end of said outer layer resin intermediate body with a contraction of said outer layer resin intermediate body toward said outer periphery of said metal roll core, while heating a remaining portion of said liquid thermosetting resin material of said viscous liquid resin material layer at said outer periphery of said metal roll core to cure said remaining portion of said liquid thermosetting resin material and form a cured thermosetting resin outer layer, and bonding said cured thermosetting resin outer layer to said outer periphery of said metal roll core, thereby forming said hard roll; and a fourth step of cutting at least an upper end portion of said cured thermosetting resin outer layer to form an outer layer end face approximately perpendicular to said metal roll core;

wherein a helical cooling-heating pipe for passing a cooling fluid or a heating fluid therethrough is wound around said outer periphery of said metal roll core in said first step, said liquid thermosetting resin material being cooled from said outer periphery of said metal roll core in said second step by passing said cooling fluid through said helical cooling-heating pipe, said viscous liquid resin material layer being heated from said outer periphery of said metal roll core in said third step by passing said heating fluid through said helical cooling-heating pipe to provide said cure of said remaining portion of said liquid thermosetting resin material, thereby providing said bonding of said cured thermosetting resin outer layer to said outer periphery of said metal roll core, and outer layer end faces are formed approximately perpendicularly to said metal roll core in said fourth step by cutting said cured thermosetting resin outer layer at upper and lower end portions to form cut upper and lower end portions, and removing said cut upper and lower end portions; and wherein a fiber-reinforced lower winding layer is provided around said outer periphery of said metal roll core and said metal roll core has a helical pipe fitting groove formed in a circumferential surface of said outer periphery, and said helical cooling-heating pipe is helically wound around said outer periphery of said metal roll core by fitting said helical cooling-heating pipe in said helical pipe fitting groove.

12. A process for producing a hard roll comprising:

a first step of disposing an outer layer forming outer mold around a metal roll core provided in an upright position at a distance from a central axis of said metal roll core to form, between said metal roll core and said outer mold, a resin material casting space having a closed lower end and an open upper end and casting a liquid thermosetting resin material into said resin material casting space;

a second step of heating said liquid thermosetting resin material from outside said outer mold to cure a major portion of said liquid thermosetting resin material and form an outer layer resin intermediate body, while cooling said liquid thermosetting resin material from an outer periphery of said metal roll core to hold a portion of said liquid thermosetting resin material, adjacent said outer periphery of said metal roll core, in a viscous liquid state, thereby providing a viscous liquid resin material layer between said outer layer resin intermediate body and said outer periphery of said metal roll core;

a third step of subsequently cooling, from outside said outer mold, said outer layer resin intermediate body which is still contained in said resin material casting space to contract said outer layer resin intermediate body chiefly by thermal shrinkage of said outer layer resin intermediate body and allowing an excess of said liquid thermosetting resin material of said viscous liquid resin material layer between said outer layer resin intermediate body and said outer periphery of said metal roll core to be forced out beyond an upper end of said outer layer resin intermediate body with a contraction of said outer layer resin intermediate body toward said outer periphery of said metal roll core, while heating a remaining portion of said liquid thermosetting resin material of said viscous liquid resin material layer at said outer periphery of said metal roll core to cure said remaining portion of said liquid thermosetting resin material and form a cured thermosetting resin outer layer, and bonding said cured thermosetting resin outer layer to said outer periphery of said metal roll core, thereby forming said hard roll; and a fourth step of cutting at least an upper end portion of said cured thermosetting resin outer layer to form an outer layer end face approximately perpendicular to said metal roll core;

wherein a helical cooling-heating pipe for passing a cooling fluid or a heating fluid therethrough is wound around said outer periphery of said metal roll core in said first step, said liquid thermosetting resin material being cooled from said outer periphery of said metal roll core in said second step by passing said cooling fluid through said helical cooling-heating pipe, said viscous liquid resin material layer being heated from said outer periphery of said metal roll core in said third step by passing said heating fluid through said helical cooling-heating pipe to provide said cure of said remaining portion of said liquid thermosetting resin material, thereby providing said bonding of said cured thermosetting resin outer layer to said outer periphery of said metal roll core, and outer layer end faces are formed approximately perpendicularly to said metal roll core in said fourth step by cutting said cured thermosetting resin outer layer at upper and lower end portions to form cut upper and lower end portions, and removing said cut upper and lower end portions; and wherein said third step comprises, following said bonding step, casting additional liquid thermosetting resin material into said helical cooling-heating pipe and curing said additional liquid thermosetting resin material to form a filling layer in an interior of said helical cooling-heating pipe.

* * * * *